US008422040B2

(12) United States Patent
Noguchi et al.

(10) Patent No.: US 8,422,040 B2
(45) Date of Patent: Apr. 16, 2013

(54) IMAGE FORMING SYSTEM AND METHOD, MANAGEMENT APPARATUS, AND RECORDING MEDIUM

(75) Inventors: Yuusuke Noguchi, Kanagawa (JP); Akeo Maruyama, Tokyo (JP); Tetsuo Ohtsuka, Saitama (JP); Yoshiya Itoh, Kanagawa (JP); Michio Sumiyoshi, Osaka (JP); Shinichi Kudo, Kanagawa (JP); Kazunori Kobayashi, Tokyo (JP); Tomohiro Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 473 days.

(21) Appl. No.: 12/359,417

(22) Filed: Jan. 26, 2009

(65) Prior Publication Data

US 2009/0190154 A1 Jul. 30, 2009

(30) Foreign Application Priority Data

Jan. 30, 2008 (JP) ................................. 2008-019726

(51) Int. Cl.
*G06F 15/00* (2006.01)
(52) U.S. Cl.
USPC ............ 358/1.13; 358/1.15; 358/1.4; 710/11
(58) Field of Classification Search ........................ None
See application file for complete search history.

(56) References Cited

U.S. PATENT DOCUMENTS

| 6,330,611 | B1 | 12/2001 | Itoh et al. | |
|---|---|---|---|---|
| 6,415,351 | B1 | 7/2002 | Kobayashi et al. | |
| 6,513,113 | B1 | 1/2003 | Kobayashi | |
| 6,650,431 | B1* | 11/2003 | Roberts et al. | 358/1.15 |
| 6,757,070 | B1* | 6/2004 | Lin et al. | 358/1.1 |
| 6,792,223 | B2 | 9/2004 | Kobayashi | |
| 7,221,468 | B2 | 5/2007 | Kobayashi | |
| 7,461,255 | B2* | 12/2008 | Iwamura | 713/176 |
| 7,903,267 | B2* | 3/2011 | Yasui et al. | 358/1.13 |
| 2002/0097431 | A1* | 7/2002 | Ikegami | 358/1.15 |

(Continued)

FOREIGN PATENT DOCUMENTS

| JP | 11-110161 | 4/1999 |
|---|---|---|
| JP | 11-149360 | 6/1999 |

(Continued)

OTHER PUBLICATIONS

Chinese Office Action dated Jul. 9, 2010.

(Continued)

*Primary Examiner* — Twyler Haskins
*Assistant Examiner* — Helen Q Zong
(74) *Attorney, Agent, or Firm* — IPUSA, PLLC

(57) ABSTRACT

An image forming system includes one or more image forming apparatuses and a management apparatus. The management apparatus includes: a software component retention part configured to retain one or more software components in a storage unit, the software components each being configured to generate output format data in a data format interpretable by a printer engine of a corresponding one or more of the image forming apparatuses from application data; a determination part configured to determine, based on the specified image forming apparatus, one of the software components to be used to generate the output format data corresponding to the specified image forming apparatus; and a transmission part configured to transmit the generated output format data to the specified image forming apparatus. The specified image forming apparatus includes an image forming part to form a predetermined image on an image forming medium based on the transmitted output format data.

13 Claims, 16 Drawing Sheets

U.S. PATENT DOCUMENTS

| | | | |
|---|---|---|---|
| 2004/0205619 A1* | 10/2004 | Twede et al. | 715/523 |
| 2005/0052677 A1 | 3/2005 | Maruyama | |
| 2005/0057774 A1 | 3/2005 | Maruyama | |
| 2005/0076299 A1* | 4/2005 | Simpson et al. | 715/527 |
| 2006/0001908 A1* | 1/2006 | Ohta | 358/1.15 |
| 2006/0139675 A1* | 6/2006 | Lee et al. | 358/1.13 |
| 2006/0192999 A1* | 8/2006 | Kawai | 358/1.15 |
| 2006/0215219 A1 | 9/2006 | Yorimoto et al. | |
| 2007/0206217 A1 | 9/2007 | Maruyama | |
| 2007/0229891 A1* | 10/2007 | Yanagi et al. | 358/1.15 |
| 2007/0230463 A1* | 10/2007 | Shima et al. | 370/389 |
| 2007/0299989 A1 | 12/2007 | Maruyama | |
| 2008/0034127 A1* | 2/2008 | Nishio | 710/11 |
| 2008/0137135 A1* | 6/2008 | Takeishi | 358/1.15 |
| 2008/0158581 A1* | 7/2008 | Ferlitsch | 358/1.13 |
| 2008/0204798 A1* | 8/2008 | Taniguchi et al. | 358/1.15 |
| 2008/0304101 A1* | 12/2008 | Sasase | 358/1.15 |

FOREIGN PATENT DOCUMENTS

| | | |
|---|---|---|
| JP | 11-249847 | 9/1999 |
| JP | 2003-280842 | 10/2003 |
| JP | 2005-111846 | 4/2005 |
| JP | 2006-134245 | 5/2006 |
| JP | 2006-155288 | 6/2006 |
| JP | 2006-270385 | 10/2006 |

OTHER PUBLICATIONS

Japanese Office Action dated Feb. 28, 2012.
Japanese Office Action dated Jul. 24, 2012.

* cited by examiner

FIG.10

| PRINTER MACHINE TYPE ID | GENERATION MODULE NAME | VERSION |
|---|---|---|
| abc1234 | GENERATION MODULE A | 1.02 |
| abc1235 | GENERATION MODULE B | 1.02 |
| .... | .... | .... |
| xyz5678 | GENERATION MODULE N | 1.01 |

| NETWORK ADDRESS (GLOBAL IP ADDRESS) | PRINTER MACHINE TYPE ID | PRINTER INFORMATION |
|---|---|---|
| 123:2345:90:ab:cdef::3494:0076 | abc1234 | DUPLEX UNIT |
| 123:2345:90:ab:cdef::3494:0087 | abc1235 | EXTENSION PAPER OUTPUT TRAY B |
| .... | .... | .... |
| 123:2345:90:ab:cdef::3494:0101 | xyz5678 | LARGE-CAPACITY PAPER FEED TRAY A |

| NETWORK ADDRESS | PRINTER IDENTIFICATION ID | PRINTER MACHINE TYPE ID | PRINTER INFORMATION |
|---|---|---|---|
| 192.168.8.76 | 12345678a | abc1234 | DUPLEX UNIT |
| 192.168.9.87 | 12345678b | abc1235 | EXTENSION PAPER OUTPUT TRAY B |
| .... | .... | .... | .... |
| 192.168.1.23 | 12345678n | xyz5678 | LARGE-CAPACITY PAPER FEED TRAY A |

71c

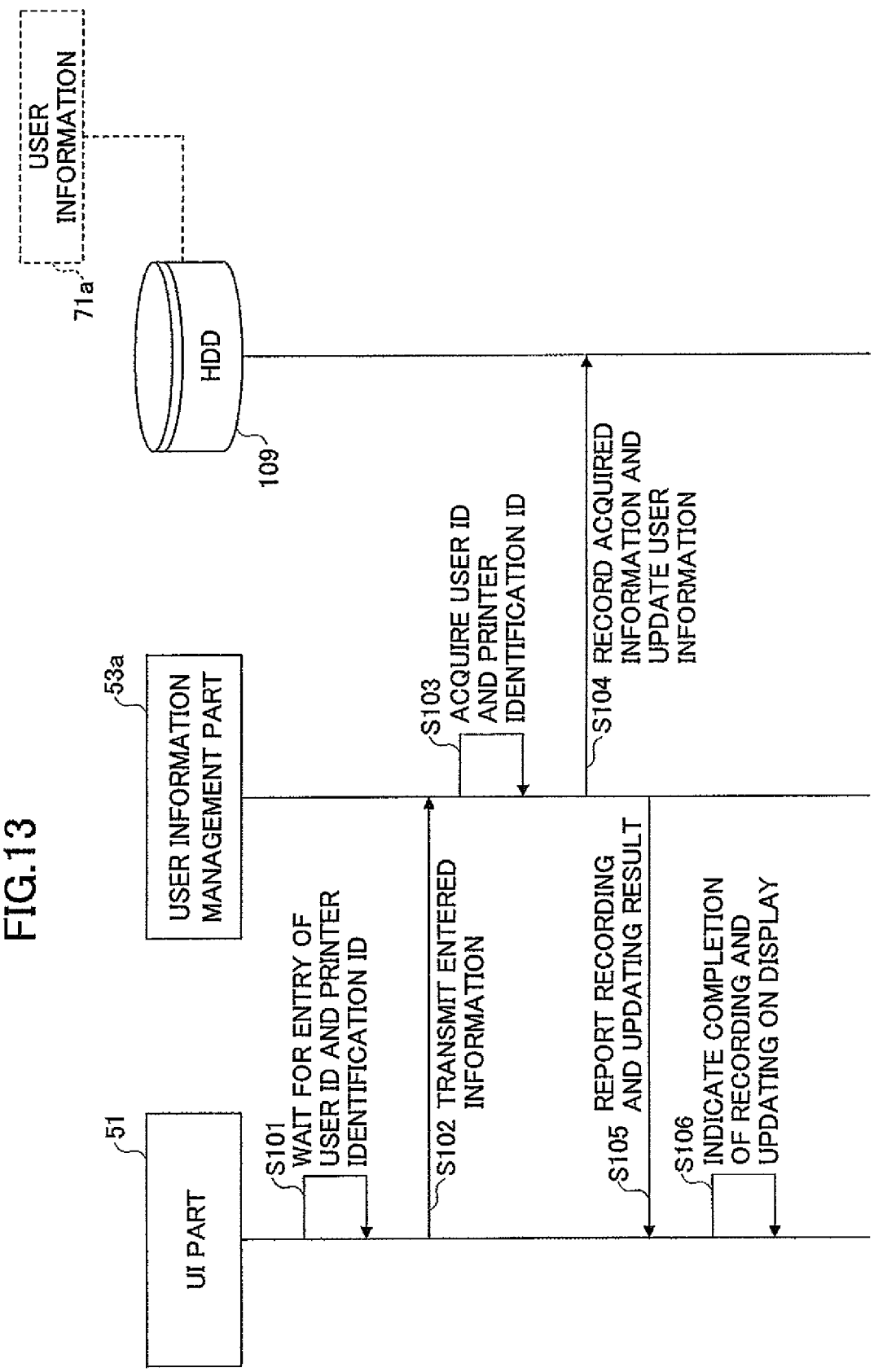

FIG.14

| USER ID | RECORDED PRINTER IDENTIFICATION ID LIST | SELECTED PRINTER IDENTIFICATION ID |
|---|---|---|
| user01@abc.bb.cc | 12345678a, 12345678b | 12345678b |
| user02@abc.bb.cc | 12345678b | 12345678b |
| ..... | ..... | ..... |
| user0X@abc.bb.cc | 12345678n, 12345678a | 12345678n |

71a

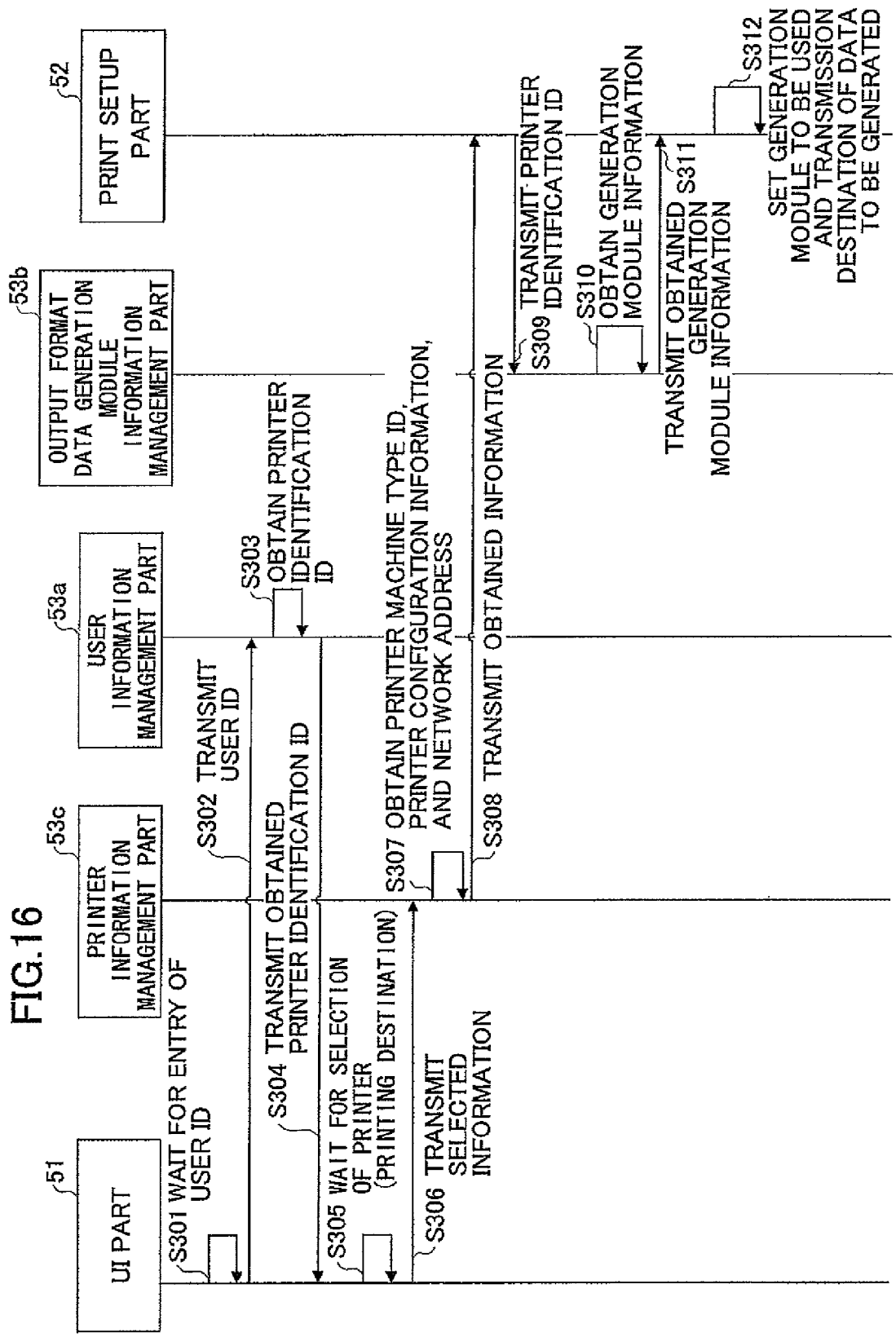

IMAGE FORMING SYSTEM AND METHOD, MANAGEMENT APPARATUS, AND RECORDING MEDIUM

BACKGROUND OF THE INVENTION

1. Field of the Invention

A certain aspect of the embodiment(s) discussed herein is related to an image forming system, apparatus, and method for forming a predetermined image on an image forming medium in response to and/or in accordance with a print request, a management apparatus configured to manage the image forming system, and a recording medium in which a program for causing a computer to execute the image forming method is recorded.

A certain aspect of the embodiment(s) discussed herein is related to a technique for the management apparatus to manage and operate an image forming function provided to a user.

2. Description of the Related Art

Conventional image forming systems are formed of, for examples apparatuses having software as illustrated in FIG. 1. Referring to FIG. 1, for example, application software AP for editing and creating document data or image data, a printer driver PD that generates print data such as PDL (Page Description Language) data based on a metafile from the application software AP, in which metafile a drawing procedure is defined, and a print data transmission module DSM that transmits the generated print data to a printer 2000 that is a printing destination are installed in a personal computer (PC) 1000. By causing these software components to operate together, the PC 1000 generates print data in a data format interpretable by the printer 2000 from document data or image data contained in a hard disk drive (HDD) 1109, and transmits the generated print data together with a print request and printing condition information to the printer 2000.

On the other hand, a print data parser DP that interprets print data and generates output-format data in a data format interpretable by a printer engine (not graphically illustrated) is installed in the printer 2000. By causing this software component to operate, the printer 2000 forms and prints a predetermined image on recording paper based on the print data received from the PC 1000.

In such an image forming system, it is desired that the combination of the printer driver PD installed in the PC 1000 and the print data parser DP that operates in the printer 2000 to be used be managed in a simplified manner.

For normal printing in the above-described image forming system, the printer driver PD installed in the PC 1000 generates plotter-output-format data interpretable by the print data parser DP that operates in the printer 2000 serving as a printing destination. That is, there is dependence between the print data parser DP and the printer driver PD.

Therefore, in the above-described image forming system, it is impossible to respond in a flexible and simplified manner to changes in the system environment such as an increase or decrease in the number of apparatuses including the PC 1000 and the printer 2000, a change of the operating system (OS) of the PC 1000, and the upgrading of the print data parser DP that operates in the printer 2000.

For example, the following techniques have been proposed in order to solve the above-described problem.

Japanese Laid-Open Patent Publication No. 2003-280842 (hereinafter, Patent Document 1) describes a printer driver updating method that compares the version of a printer driver installed in a PC and the version of the printer driver uploaded to a Web page and downloads the uploaded version of the printer driver to the PC if the installed and uploaded versions are different. Japanese Laid-Open Patent Publication No. 2006-134245 (hereinafter, Patent Document 2) describes a system for automatically installing a printer driver. The described system downloads the printer driver of a printer designated as a printing destination by a user from the database of an external apparatus, and performs automatic installation including a connection setup and a print setup. These techniques enable users to update a printer driver in a simplified manner.

Further, Japanese Laid-Open Patent Publication No. 2006-155288 (hereinafter, Patent Document 3) describes a server apparatus and a printer setup method in a server-based computing environment. According to the described server apparatus and printer setup method, if it is determined based on the information on a printer driver installed in a client that the printer driver is not recorded in the server apparatus, the printer driver of the client is installed in the server apparatus and correlated with the printer of the client. As a result, it is possible to manage and operate the same printer driver between the client and the server apparatus.

However, such conventional image forming systems as described in Patent Documents 1 through 3 have problems such as the following.

First, according to the image forming systems described in Patent Documents 1 and 2, a printer driver can be installed automatically in an apparatus to be used without dependence on a user's determination when the user requests printing. Further, according to the image forming system described in Patent Document 3, it is possible to automatically install the printer driver managed and operated by a management apparatus.

According to the conventional image forming system, however, the printer driver PD and the print data parser DP that are dependent on each other are managed and operated in difference apparatuses (an information processor and an image forming apparatus, respectively) as illustrated in FIG. 1.

Therefore, if there are a large number of image forming apparatuses to serve as printing destinations (that is, if there are a large number of image forming apparatuses managed and operated by the image forming system), an administrator who manages the image forming system has to manage the combination of the printer driver PD to be installed in the information processor and the print data parser DP to operate in the image forming apparatus in each apparatus for each machine type of the image forming apparatus. This complicates the administrator's work, thus preventing the system from being managed or operated efficiently.

Further, in the case where a user uses the conventional image forming system at home, even if the printer driver PD corresponding to the image forming apparatus purchased by the user is automatically installed, an error may occur at the time of the installation depending on the software environment of an apparatus that the user uses at the time of making a request for printing (print request). In this case, the user has to cope with the error. This, however, is such complicated work for the user that the user is required to have enough operational ability to correct the error that has occurred.

Further, recent advancement of information processing technologies and communications technologies has diversified apparatuses that users use to make a print request to an image forming apparatus, so that apart from the PC 1000, information terminals with good portability, such as cellular phones and personal digital assistants (PDAs), are available. Therefore, unlike before, apparatuses used by users to make a print request are not limited to information processors having an environment that enables installation of a printer driver or stable operations after the installation of the printer driver, such as PCs, so that it is practically impossible for vendors to develop and provide printer drivers that support respective apparatuses used to make a print request.

Therefore, it is desirable that the printer driver PD and the print data parser DP, which are conventionally installed in different apparatuses, be put together as a single function and be managed and operated in a single apparatus without dependence on the environment of the apparatus used by a user to make a print request.

Thus, the conventional image forming system has the problem of not being able to provide a manager (administrator)/operator and users of the image forming system with an image forming function with good usability to their satisfaction.

SUMMARY OF THE INVENTION

Embodiments of the present invention may solve or reduce one or more of the above-described problems.

According to one embodiment of the present invention, an image forming system, apparatus, and method and a management apparatus are provided in which one or more of the above-described problems may be solved or reduced, and a recording medium is provided in which a program for causing a computer to execute the image forming method is recorded.

According to one embodiment of the present invention, an image forming system, apparatus, and method and a management apparatus are provided that are capable of providing an image forming function with good usability to both a user and the administrator, and a recording medium in which a program for causing a computer to execute the image forming method is provided.

According to one embodiment of the present invention, there is provided an image forming system including one or more image forming apparatuses; and a management apparatus configured to manage and operate the image forming system, to receive a print request transmitted from an information processor, and to instruct, in accordance with the print request, one of the image forming apparatuses specified as a printing destination to perform a predetermined image forming operation, wherein the management apparatus includes: a storage unit; a software component retention part configured to retain one or more software components in a predetermined storage area of the storage unit, the software components each being configured to generate output format data in a data format interpretable by a printer engine of a corresponding one or more of the image forming apparatuses from application data; a determination part configured to determine, based on the one of the image forming apparatuses specified as the printing destination, one of the software components retained in the storage unit to be used to generate the output format data corresponding to the one of the image forming apparatuses specified as the printing destination; and a transmission part configured to transmit the output format data generated by the determined one of the software components to the one of the image forming apparatuses specified as the printing destination, and the one of the image forming apparatuses specified as the printing destination includes an image forming part configured to form a predetermined image on an image forming medium based on the output format data transmitted from the transmission part of the management apparatus.

According to one embodiment of the present invention, there is provided a management apparatus configured to manage and operate an image forming system, to receive a print request transmitted from an information processor, and to instruct, in accordance with the print request, one of one or more image forming apparatuses specified as a printing destination to perform a predetermined image forming operation, the management apparatus including a storage unit; a software component retention part configured to retain one or more software components in a predetermined storage area of the storage unit, the software components each being configured to generate output format data in a data format interpretable by a printer engine of a corresponding one or more of the image forming apparatuses from application data; a determination part configured to determine, based on the one of the image forming apparatuses specified as the printing destination, one of the software components retained in the storage unit to be used to generate the output format data corresponding to the one of the image forming apparatuses specified as the printing destination; and a transmission part configured to transmit the output format data generated by the determined one of the software components to the one of the image forming apparatuses specified as the printing destination.

According to one embodiment of the present invention, there is provided an image forming method in an image forming system including one or more image forming apparatuses; and a management apparatus configured to manage and operate the image forming system, to receive a print request transmitted from an information processor, and to instruct, in accordance with the print request, one of the image forming apparatuses specified as a printing destination to perform a predetermined image forming operation, the image forming method including the steps of: retaining one or more software components in a predetermined storage area of a storage unit of the management apparatus, the software components each being configured to generate output format data in a data format interpretable by a printer engine of a corresponding one or more of the image forming apparatuses from application data; determining, based on the one of the image forming apparatuses specified as the printing destination, one of the software components retained in the storage unit to be used to generate the output format data corresponding to the one of the image forming apparatuses specified as the printing destination; transmitting the output format data generated by the determined one of the software components to the one of the image forming apparatuses specified as the printing destination; and forming a predetermined image on an image forming medium based on the output format data transmitted by said step of transmitting.

Thus, according to one aspect of the present invention, it is possible to provide an image forming system, a management apparatus, and an image forming method capable of providing a highly usable image forming function to both a user and the administrator and a computer-readable recording medium storing a program for causing a computer to execute the image forming method.

BRIEF DESCRIPTION OF THE DRAWINGS

Other objects, features and advantages of the present invention will become more apparent from the following detailed description when read in conjunction with the accompanying drawings, in which:

FIG. 10 shows a data configuration of output format data generation module information according to the embodiment of the present invention;

FIGS. 12A and 12B show data configurations of the printer information according to the embodiment of the present invention;

FIG. 13 is a sequence diagram illustrating a first example of recording specifiable printing destination information on a user-by-user basis according to the embodiment of the present invention;

FIG. 14 shows a data configuration of user information according to the embodiment of the present invention;

FIG. 16 is a sequence diagram illustrating an example of setting the output format data generation module and the transmission destination information (network address) of generated data according to the embodiment of the present invention.

DETAILED DESCRIPTION OF THE PREFERRED EMBODIMENTS

A description is given, with reference to the accompanying drawings, of an embodiment of the present invention.

[System Configuration]

Figure 2:
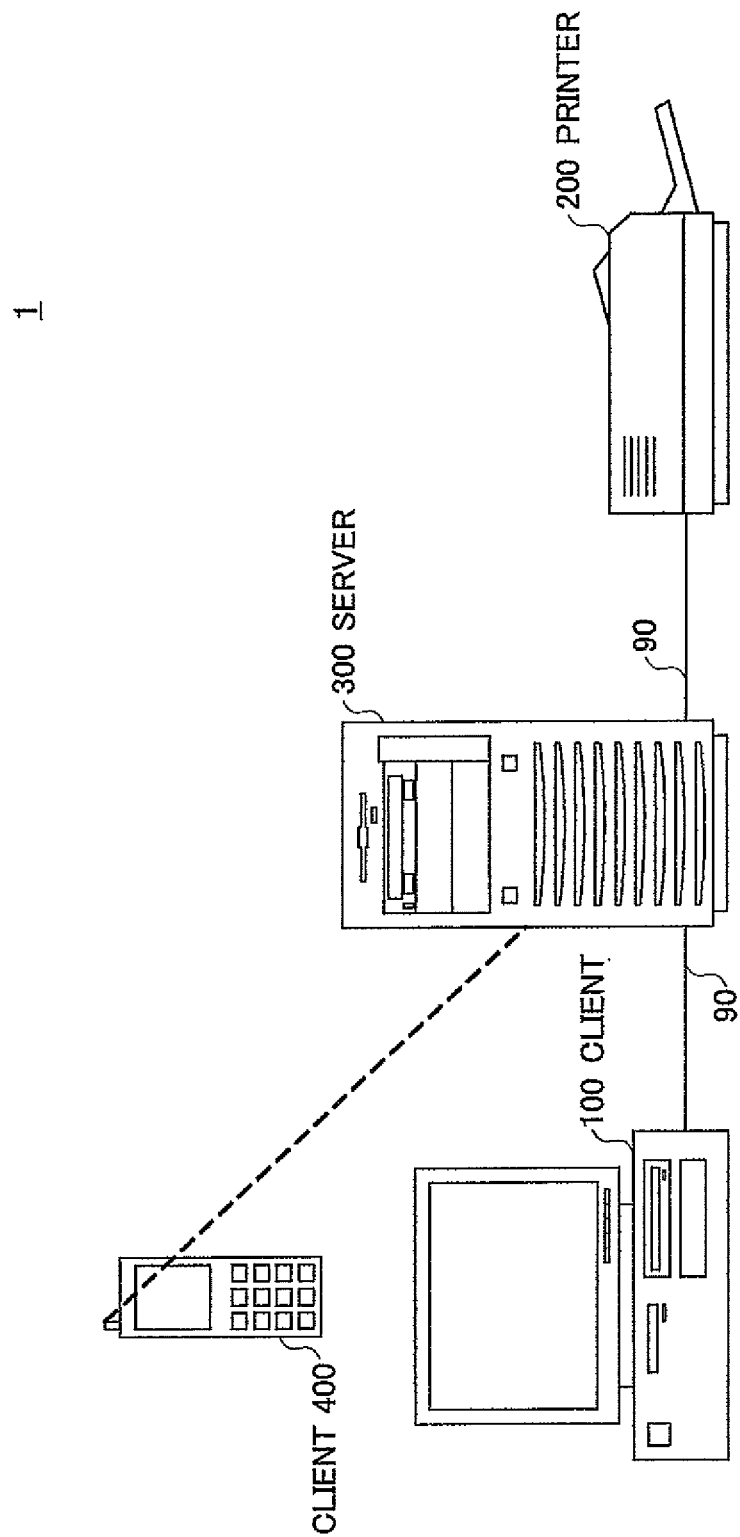
FIG. 2 is a diagram illustrating a system configuration of an image forming system according to an embodiment of the present invention.

First, a description is given, with reference to FIG. 2, of a system configuration of an image forming system 1 according to this embodiment. FIG. 2 is a diagram illustrating a system configuration of the image forming system 1 according to this embodiment.

For example, as illustrated in FIG. 2, the image forming system 1 of this embodiment includes an information processor 100 (client), an image forming apparatus 200 (such as a printer), and a management apparatus 300 (server). A variety of application software programs are installed in the information processor 100. The information processor 100 transmits application data created by the application software to the management apparatus 300. The management apparatus 300 receives the application data from the information processor 100, and performs predetermined image processing on the received application data to generate print data. Then, the management apparatus 300 transmits the generated print data to the image forming apparatus 200, and makes a print request to the image forming apparatus 200. The image forming apparatus 200 receives the print data from the management apparatus 300, and performs predetermined image forming processing (performs printing) in accordance with the print request based on the received print data. The client 100, the image forming apparatus 200, and the management apparatus 300 are connected with data transmission lines 90 capable of communicating application data and print data.

The data transmission lines 90 connecting the information processor 100, the management apparatus 300, and the image forming apparatus 200 are, for example, network cables. That is, the information processor 100, the management apparatus 300, and the image forming apparatus 200 are connected via a network (telecommunications circuit) such as a local area network (LAN) or wide area network (WAN) constructed of a wired and/or wireless circuit so as to enable two-way data communications among them. Further, according to the image forming system 1, an information terminal 400 (client) such as a cellular phone or PDA can perform data communications with the management apparatus 300 via a predetermined telecommunications circuit.

[Hardware Configuration]

Figure 3:
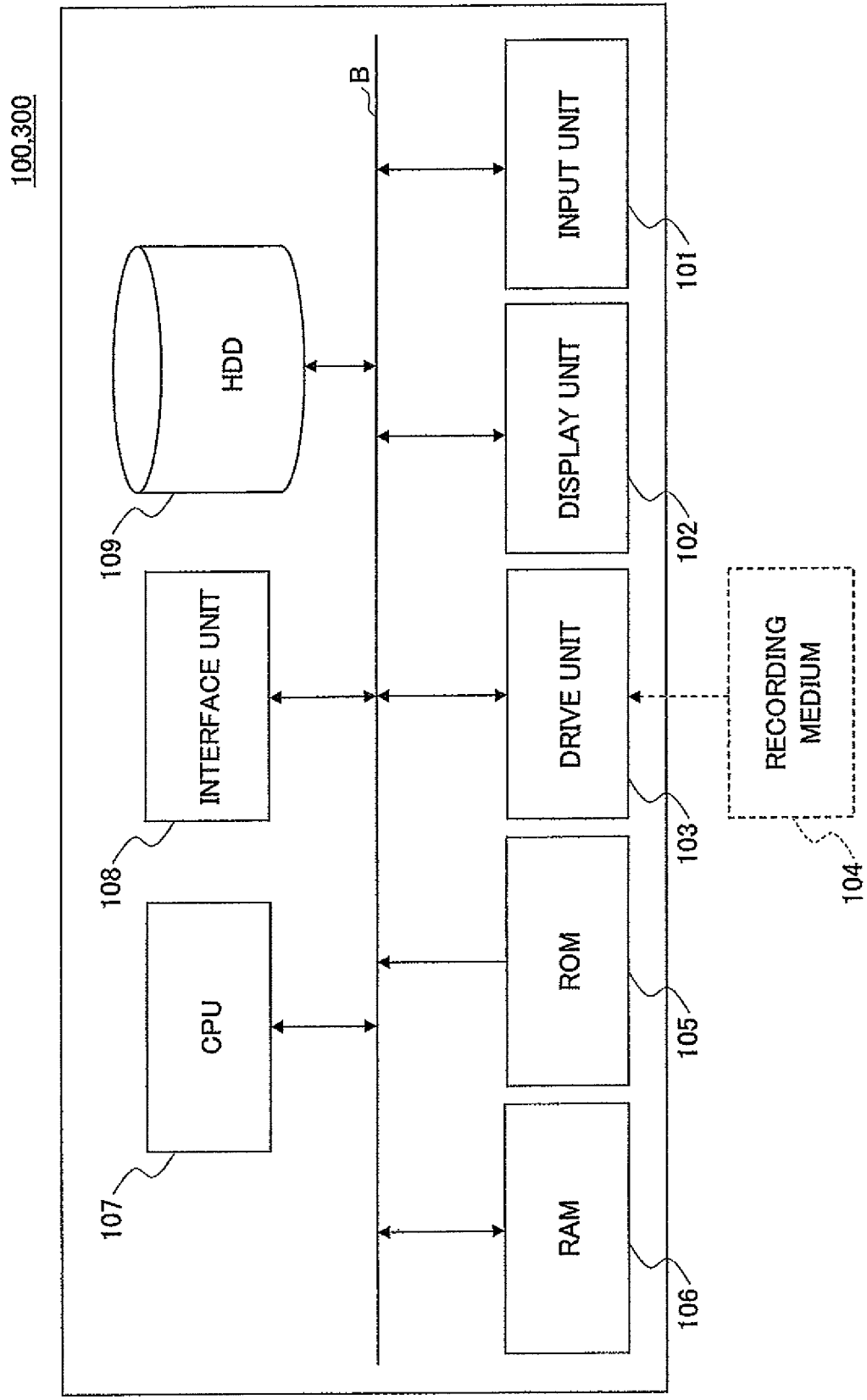
FIG. 3 is a block diagram illustrating a hardware configuration of an information processor and a management apparatus according to the embodiment of the present invention.
Figure 4:
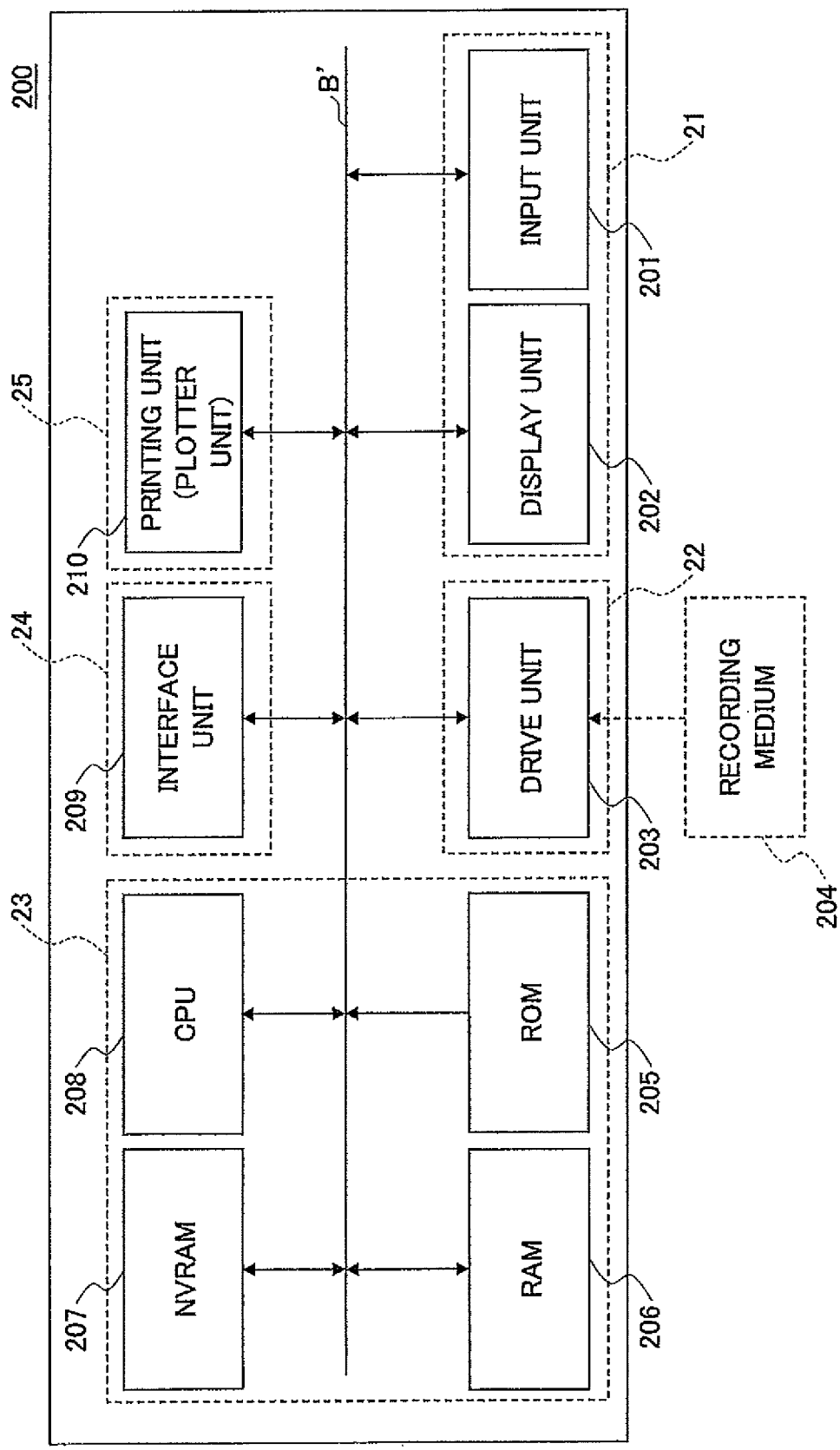
FIG. 4 is a block diagram illustrating a hardware configuration of an image forming apparatus according to the embodiment of the present invention.

Next, a description is given, with reference to FIG. 3 and FIG. 4, of a hardware configuration of the information processor 100, which is a client, a hardware configuration of the management apparatus 300, which is a server, and a hardware configuration of the image forming apparatus 200, which is a printer, of the image forming system 1 according to this embodiment. A description of a hardware configuration of the information terminal 400 is omitted herein because the information terminal 400 is another example of the information processor having a communications function that can establish a connection with the management apparatus 300.

(Information Processor and Management Apparatus [Client and Server])

FIG. 3 is a block diagram illustrating a hardware configuration of the information processor 100 (client) and the management apparatus 300 (server) according to this embodiment.

Each of the information processor 100 and the management apparatus 300 according to this embodiment is a common PC, and includes an input unit 101, a display unit 102, a drive unit 103, a read-only memory (ROM) 105, a random access memory (RAM) 106, a central processing unit (CPU) 107, an interface unit 108, and an HDD 109, which are interconnected through a bus B.

The input unit 101 includes a keyboard and a mouse, and is used to input operational signals to the information processor 100/the management apparatus 300. The display unit 102 includes a display (display part), and displays, for example, the user interface (UI) screen of application software. The interface unit 108 connects the information processor 100 or the management apparatus 300 to a data transmission channel 90, which is an example of the telecommunications circuit. The HDD 109 contains various application programs and their related data, and document and image data. The application programs include an operating system (OS), which is basic software, word processing software, and image editing software. Further, the HDD 109 manages these various programs and data with a predetermined file system and a database (DB).

The various programs and related data are provided to the information processor 100 or the management apparatus 300 through a recording medium 104 such as a compact disk read-only memory (CD-ROM). The recording medium 104 containing the various programs and related data is loaded into the drive unit 103 so that the various programs and related data are installed in the HDD 109 through the drive unit 103. Alternatively, the various programs and related data may be downloaded into and installed in the HDD 109 from a predetermined storage unit through the data transmission channel 90, which is an example of the telecommunications circuit.

The ROM 105 contains BIOS (Basic Input/Output System) programs and data that are executed at the time of booting the information processor 100 or the management apparatus 300. The RAM 106 temporarily retains various programs or data read from the ROM 105 or the HDD 109. The CPU 107 executes a program retained temporarily by the RAM 106.

(Image Forming Apparatus [Printer])

FIG. 4 is a block diagram illustrating a hardware configuration of the image forming apparatus 200 according to this embodiment.

Referring to FIG. 4, the image forming apparatus 200 according to this embodiment includes an operations panel 21, a storage media interface (I/F) 22, a controller 23, a data communications I/F 24, and a plotter 25, which are interconnected through a bus B'.

The operations panel 21 includes an input unit 201 and a display unit 202. The input unit 201 includes hardware keys, and is used to input various operational signals to the image forming apparatus 200. The display unit 102 includes a display, and displays, for example, various information items related to an image forming operation. The data communications I/F 24 includes an interface unit 209, and connects the image forming apparatus 200 to the data transmission channel 90, which is an example of the telecommunications circuit. Further, according to this embodiment, in the case of performing data communications through a network through the data communications I/F 24, a common IP address (an IPv4-compliant network address) or a global IP address (an IPv6-compliant network address) is assigned to the interface unit 209. The "global IP address" mentioned herein denotes a unique IP address in the world that is assigned officially by an organization that assigns addresses (a Network Information Center [NIC] of each country) in the case of using an apparatus by connecting it to the Internet.

The printing environment provided to users by the conventional image forming system assumes an environment where an image forming apparatus installed at a particular location is used, such as an office environment. That is, users are allowed to perform printing only in an image forming apparatus connected to a network area of a predetermined range, such as a LAN or WAN. However, since the Internet, which enables transfer of a large amount of data, has become popular with recent advancement of communications technologies (higher data transfer speed and a larger transfer amount), users can uniquely specify an image forming apparatus connected to the Internet by specifying its global IP address and can perform printing without conventional usage restrictions as long as the Internet is available.

The storage media I/F 22 includes a drive unit 203, and enables various electronic data items contained in a recording medium 204 such as a memory card to be read through the drive unit 203.

The controller 23 includes a ROM 205, a RAM 206, a non-volatile RAM (NVRAM) 207, and a CPU 208. The ROM 205 contains various system-control-related programs to be executed at the time of booting the image forming apparatus 200 and their related data and various programs for image forming processing and their related data. The RAM 206 temporarily retains various programs and their related data read from the ROM 205. Further, the NVRAM 207 contains the default values of the operation setup for operations of the various functions of the image forming apparatus 200, such as the default values related to print conditions.

Further, the CPU 208 executes a program retained temporarily by the RAM 206. For example, in the case of receiving data composed of a print control command (hereinafter referred to as "raster command") and converted into an output format interpretable by the plotter 25 described below (hereinafter referred to as "plotter output format data") from the management apparatus 300 through the data communications I/F 24, the CPU 208 executes a program (a below-described command interpretation module) that can interpret the raster command included in the plotter output format data read into the RAM 206 from the ROM 205, so that the controller 23 interprets the raster command written in the received plotter output format data and generates a bitmap image (print image data).

The plotter 25, which is also referred to as "printer engine," includes a printing unit 210. The plotter 25 prints a bitmap image on recording paper by, for example, electrophotography. Here, the image forming method of the image forming apparatus 200 according to this embodiment is not limited to electrophotography, and may be other image forming methods such as thermal transfer printing and ink-jet printing.

Further, the image forming apparatus 200 according to this embodiment is not limited to a printer having an image forming function as a basic function, and may be other image forming apparatuses such as a multifunction peripheral (MFP) having multiple functions including the image forming function (such as copying and facsimile).

Thus, in the image forming system 1 according to this embodiment, which includes the information processor 100, the management apparatus 300, and the image forming apparatus 200, having the corresponding hardware configurations described above, image forming processing according to a print request from a user is performed. In the following description, the information processor 100, the management apparatus 300, and the image forming apparatus 200 are referred to as "client 100," "server 300," and "printer 200," respectively, for making a description of this embodiment easier to understand.

[Software Configuration]

Figure 5:
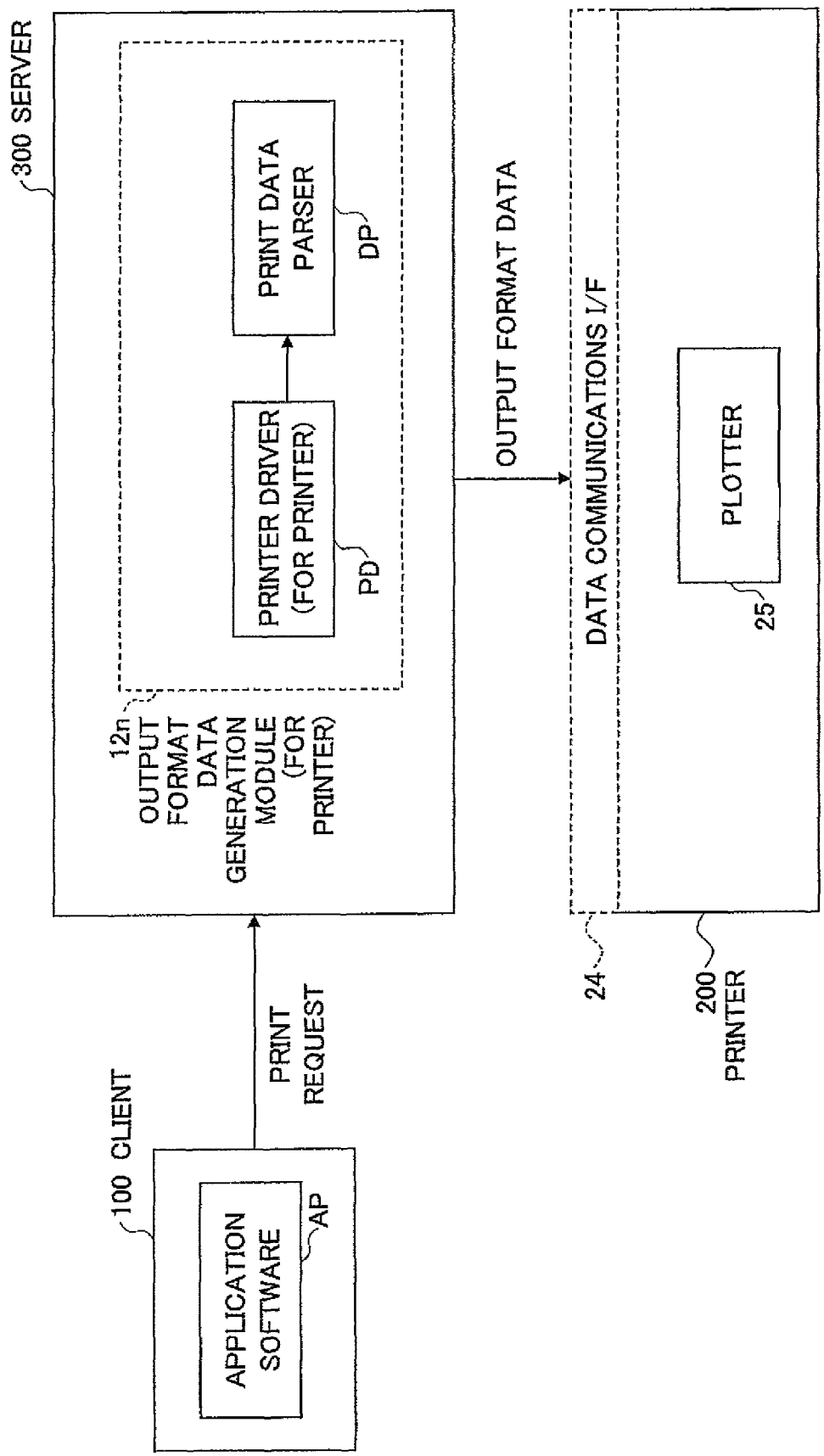
FIG. 5 is a diagram illustrating an operation of image forming processing according to the embodiment of the present invention.
Figure 6:
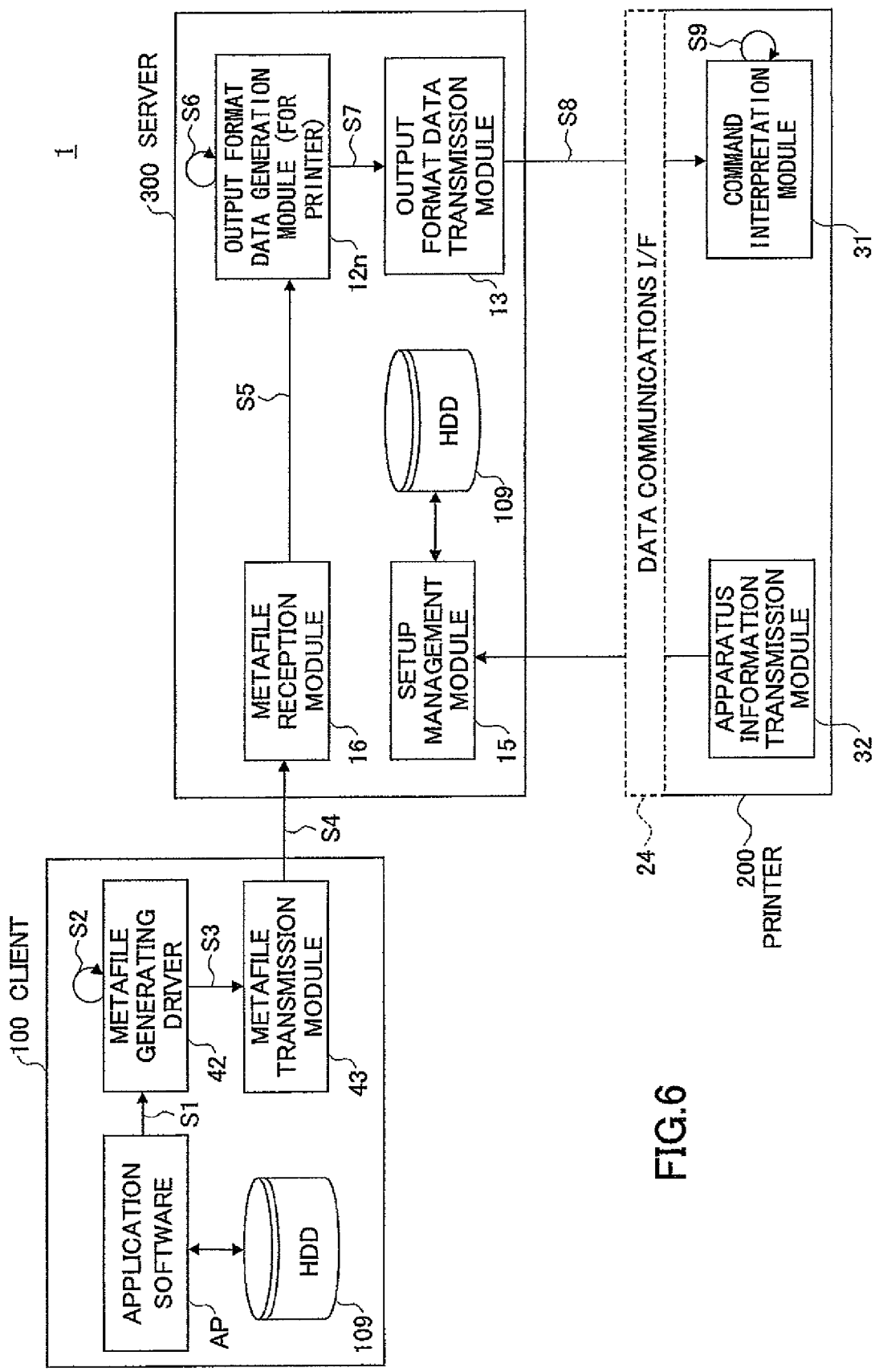
FIG. 6 is a block diagram illustrating a software configuration of the image forming system according to the embodiment of the present invention.
Figure 7:
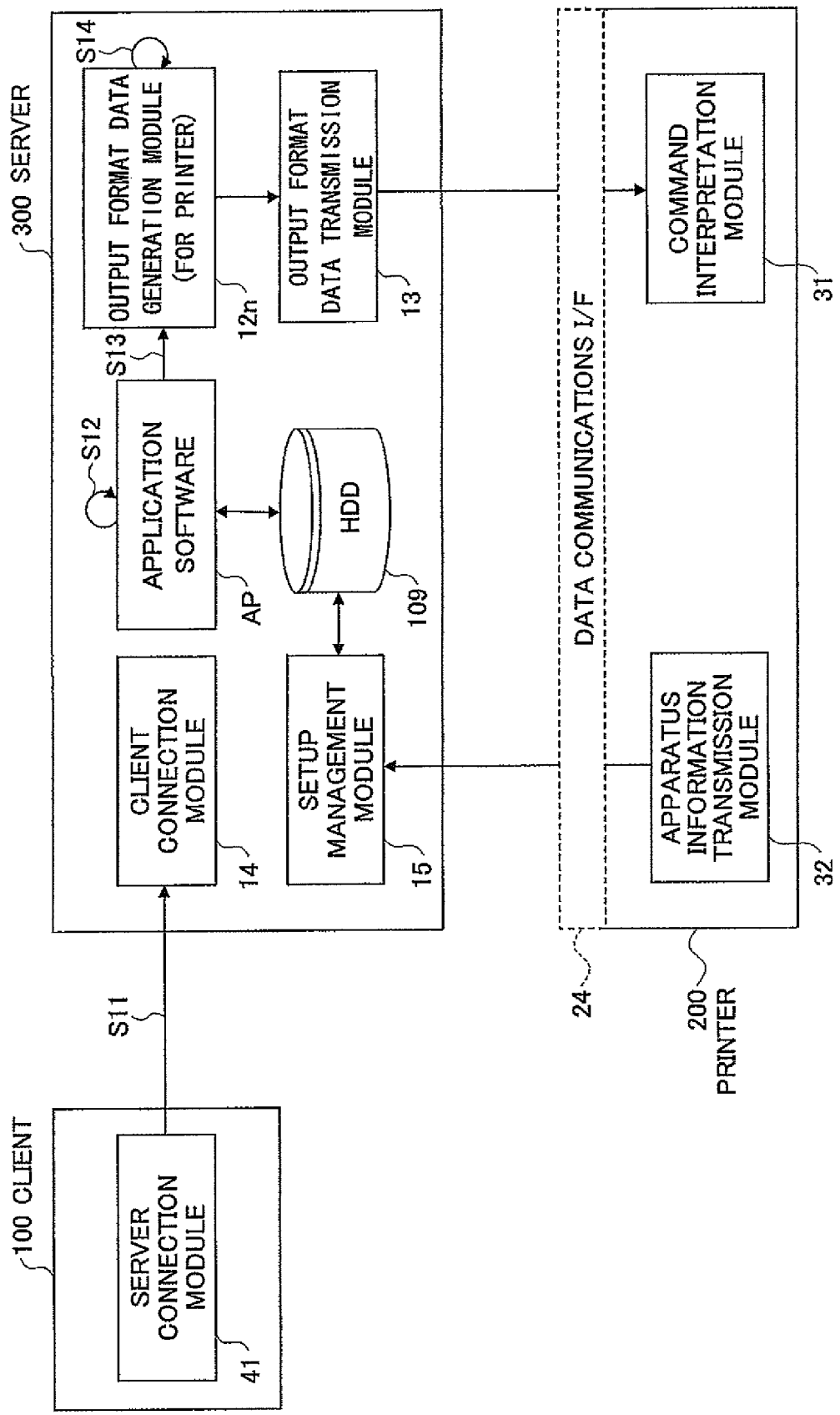
FIG. 7 is a block diagram illustrating another software configuration of the image forming system according to the embodiment of the present invention.

A description is given, with reference to FIG. 5, FIG. 6, and FIG. 7, of a software configuration of the image forming system 1 according to this embodiment. In the following description of the software configuration, first, an outline of differences from the conventional configuration (that is, technical features of this embodiment) is given, and then a description is given of specific software configurations in the apparatuses forming the image forming system 1.

(Difference from the Conventional Configuration [Technical Features of this Embodiment])

Figure 1:
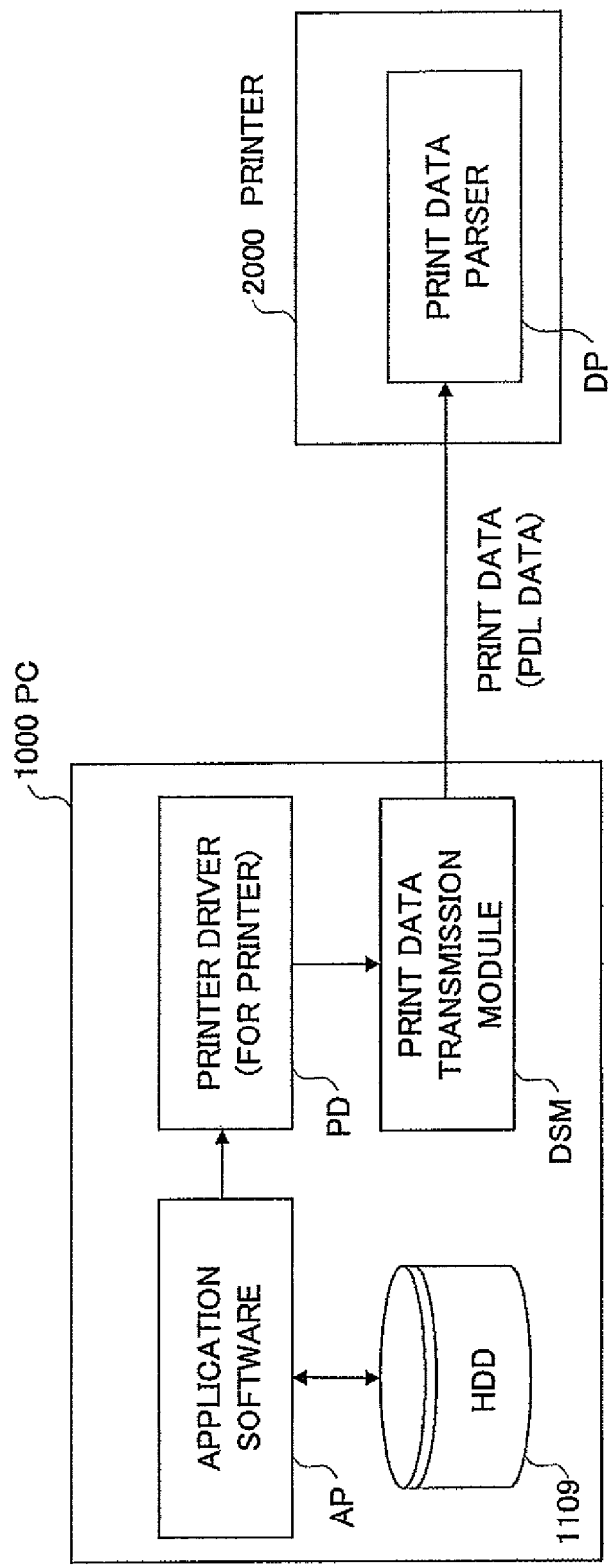
FIG. 1 is a block diagram illustrating a system configuration of a conventional image forming system.

A description is given below, with reference to FIG. 5, of differences between the image forming system 1 according to this embodiment and the conventional image forming system illustrated in FIG. 1. FIG. 5 is a diagram illustrating image forming processing according to this embodiment.

Feature 1: Server with a Plotter Output Format Data Generating Function Implemented Therein For example, the printer driver PD that generates print data such as PDL data based on a metafile from the application software AP, in which metafile a drawing procedure is defined, and the print data parser DP that interprets print data and generates plotter output format data are installed in the server 300 according to this embodiment.

The printer driver PD and the print data parser DP are programs (hereinafter referred to as "software components") that depend on the image forming function of the printer 200. Conventionally, as illustrated in FIG. 1, the printer driver PD that generates print data interpretable by the print data parser DP that operates in the printer 2000 is required to be installed in the client (PC) 1000 in order for the client 1000 to perform printing normally in the printer 2000.

Therefore, according to the image forming system 1 of this embodiment, the software components, which conventionally depend on each other in the client 1000 and the printer 2000 at the time of constructing an environment for performing appropriate printing (hereinafter referred to as "image forming operation environment"), are put together as one function of the server 300 (or implemented by a single software component) so as to be capable of being managed and operated collectively. In this embodiment, the software component that implements the above-described function is referred to as "output format data generation module 12n." In the following description, the output format data generation module 12n may also collectively refer to multiple output format data generation modules because the server 300 according to this embodiment may include one or more output format data generation modules 12n.

Thus, in the image forming system 1 according to this embodiment, it is possible to construct an image forming operation environment in a flexible and simplified manner by adding or deleting the output format data generation module 12n in the server 300. Further, a series of operations up to generating plotter output format data from application data, which has conventionally been performed between the client 1000 and the printer 2000 through a data transmission line as various hardware items of recent information processors have become better in performance, can be performed inside the server 300, so that it is also possible to reduce processing time.

Feature 2: Printer with a Minimum Functional Configuration

Further, in the printer 200 according to this embodiment, a raster command interpreting function, which generates a bitmap image after interpreting the plotter output format data and transfers the generated bitmap image to the plotter 25, operates on the controller 23 with the function that generates the plotter output format data being transferred to the server 300 as described above.

Thus, according to the image forming apparatus 200 of this embodiment, the image forming function can be implemented with a minimum functional configuration necessary to perform an image forming operation. As a result, the image forming apparatus 200 can be configured with cheaper hardware than conventionally, and it is also possible to reduce development time for implementing functions.

(Software Configuration in Each Apparatus)

According to the image forming system 1 of this embodiment, the software components to be implemented in each apparatus differ depending on which of the client 100 (information processor such as a PC), where the application software AP editing and creating document data and image data to be printed can operate, and the client 400 (information terminal such as a cellular phone or PDA), where the application software AP cannot operate, is used by a user. In consideration of this point, first, a description is given below of System Configuration 1 with the client 100, the server 300, and the printer 200, and then a description is given of System Configuration 2 with the client 400, the server 300, and the printer 200. The description of System Configuration 2 focuses on differences from System Configuration 1.

(System Configuration 1) Configuration with Client 100, Server 300, and Printer 200

(Client [Information Processor])

Referring to FIG. 6, the software components implemented in the client 100 according to this embodiment includes the application software AP that edits and creates document data and image data, a metafile generating driver 42 that generates a metafile from the application software AP, in which metafile a series of drawing processes is defined in a data format executable by the server 300, and a metafile transmission module 43 that transmits the generated metafile to the server 300. These software components are contained (installed) in a predetermined storage area of the HDD 109 of the client 100, and are read into the RAM 106 (FIG. 3) from the HDD 109 to be executed by the CPU 107 (FIG. 3).

(Server [Management Apparatus])

Referring to FIG. 6, the software components implemented in the server 300 according to this embodiment include a metafile reception module 16, the output format data generation module 12n, an output format data transmission module 13, and a setup management module 15. The metafile reception module 16 receives a metafile transmitted from the client 100. The output format data generation module 12n, of which a description is given above with reference to differences from the conventional configuration, generates plotter output format data from the received metafile. The output format data transmission module 13 transmits the generated plotter output format data to the printer 200 specified in accordance with a transmission destination setup. The setup management module 15 manages the various settings of this image forming system 1 for controlling an image forming operation by storing them in a predetermined storage area of the HDD 109. The various settings of the image forming system 1 include the selection and setting of the output format data generation module 12n corresponding to the printer 200 that is a printing destination (setting the output format data generation module 12n used to generate plotter output format data corresponding to the printer 200 serving as a printing destination where printing is performed) and the setting of the transmission destination of the output format data transmission module 13 (setting a transmission destination to which the generated plotter output format data are to be transmitted). These software components are contained (installed) in a predetermined storage area of the HDD 109 of the server 300, and are read into the RAM 106 (FIG. 3) from the HDD 109 to be executed by the CPU 107 (FIG. 3).

(Printer [Image Forming Apparatus])

The software components implemented in the printer 200 according to this embodiment include a command interpretation module 31 and an apparatus information transmission module 32. The command interpretation module 31 generates a bitmap image after interpreting a raster command included in plotter output formation data received from the server 300 through the data communications I/F 24 and transfers the generated bitmap image to the plotter 25. The apparatus information transmission module 32 transmits the apparatus information of the printer 200 including its status information. These software components are contained in the ROM 205 of the controller 23 (FIG. 4) of the printer 200, and are read into the RAM 206 (FIG. 4) from the ROM 205 to be executed by the CPU 208 (FIG. 4).

(Outline of Image Forming Operation)

According to the image forming system 1 of this embodiment, printing in the printer 200 from the client 100 is performed in the following processes in the above-described software configuration.

(Process 1) Generation and Transmission of Metadata by Client

Referring to FIG. 6, in step S1, the client 100 receives a user's print instruction (instruction to perform printing) in the metafile generating driver 42 through the application software AP. In step S2, the client 100 generates a metafile in which a drawing procedure is defined with the metafile generating driver 42 in accordance with the received user's print instruction. Next, in step S3, the client 100 causes the generated metafile to be transferred to the metafile transmission module 43, and in step S4, causes the generated metafile to be transmitted to the server 300 by the metafile transmission module 43.

(Process 2) Generation and Transmission of Plotter Output Format Data by Server

The server 300 receives the metafile transmitted from the client 100 in the metafile reception module 16, and in step S5, causes the received metafile to be transferred to the output format data generation module 12n. Next, in step S6, the server 300 generates plotter output format data from the metafile with the output format data generation module 12n. At this point, the server 300 selects and determines the output format data generation module 12n corresponding to the printer 200 specified as a printing destination, based on the setup (setting) related to the output format data generation module 12n in the settings information for controlling an image forming operation, which settings information is transmitted from the apparatus information transmission module 32 operating in the printer 200 and managed by the setup management module 15, and generates plotter output format data. In step S7, the server 300 causes the plotter output format data thus generated to be transferred to the output format data transmission module 13. As a result, in step S8, the server 300 transmits the plotter output format data to the printer 200 by the output format data transmission module 13 based on the transmission destination setup (setting).

(Process 3) Printing by Printer

In step S9, the printer 200 interprets the plotter output format data received from the server 300 in the command interpretation module 31, generates a bitmap image based on the result of the interpretation, and causes the generated bitmap image to be transferred to the plotter 25 (FIG. 4). As a result, the printer 200 prints the bitmap image on recording paper with the plotter 25.

Thus, according to the image forming system 1 of this embodiment, printing is executed from the client 100, which is a common PC connected to a telecommunications circuit, to be performed in the printer 200 through the server 300 based on the above-described procedure (processes).

(System Configuration 2) Configuration with Client 400, Server 300, and Printer 200

The software configuration of System Configuration 2 is different from that of System Configuration 1 in, for example, the following points.

(Client [Information Terminal])

Unlike the client 100 illustrated in System Configuration 1 described above, the client 400 includes a server connection module 41 in place of the application software AP, the metafile generating driver 42, and the metafile transmission module 43 as illustrated in FIG. 7. The server connection module 41 connects to the server 300 and provides a user with a user interface (UI) function that enables operating the application software AP that runs on the server 300.

(Server [Management Apparatus])

Unlike its software configuration illustrated in System Configuration 1 described above, the server 300 includes a client connection module 14 in place of the metafile reception module 16, and further includes the application software AP, which operates in the client 100 in System Configuration 1, in addition to the output format data generation module 12n, the output format data transmission module 13, and the setup management module 15. The client connection module 14 controls two-way data communications with the client 400.

(Outline of Image Forming Operation)

According to the image forming system 1 of this embodiment, printing in the printer 200 from the client 400 is performed in the following processes in the above-described software configuration. System Configuration 2 is different from System Configuration 1 in the process of generating a metafile from the application software AP up to transferring the generated metafile to the output format data generation module 12n.

(Process 1) Connection to Server by Client

In step S11 of FIG. 7, the client 400 connects to the server 300 through the server connection module 41.

(Process 2) Operation of Application Software through UI Function

In step S12, the client 400 remotely operates the application software AP to generate a metafile in accordance with a data manipulation instruction from a user accepted through the UI function, and in step S13, causes the generated metafile to be transferred to the output format data generation module 12n. As a result, in step S14, the server 300 generates plotter output format data from the metafile with the output format data generation module 12n. The following processes up to printing in the printer 200 based on the generated plotter output format data are the same as those illustrated in System Configuration 1 described above.

Thus, according to the image forming system 1 of this embodiment, printing is executed from the client 400, which is a cellular phone or PDA connected to a telecommunications circuit, to be performed in the printer 200 through the server 300 based on the above-described procedure (processes)

With the above-described hardware and software configurations, the image forming system 1 according to this embodiment selects and determines the output format data generation module 12n suitably corresponding to the printer 200 serving as a printing destination specified by a user, generates plotter output format data with the determined output format data generation module 12n in the server 300, and transmits the generated plotter output format data to the printer 200 serving as a printing destination, thereby implementing an image forming function that makes it possible to execute printing in the printer 200 from various user terminals such as the client 100 and the client 400 through the server 300.

In the following, a specific description is given, with reference to FIG. 8 through FIG. 15, of how the image forming system 1 according to this embodiment implements the image forming operation as described above.

[Image Forming Function]

According to the image forming system 1 of this embodiment, a group of software components depending on the image forming function, which are conventionally distributed among various user terminals (such as a PC and a cellular phone or PDA) and a printer, are put together as a single function (output format data generation module 12n) in the server 300 to be managed and operated collectively. Therefore, according to the image forming function of the image forming system 1, when a printing destination is specified by a user, an appropriate one of multiple output format data generation modules 12n (for example, multiple output format data generation modules A through N illustrated in FIG. 8) installed in correspondence to printers 200 providing print services is selected and determined, and plotter output format data to be transmitted to the specified printer 200 is generated by the determined output format data generation module 12n in the server 300. Accordingly, how the setup management module 15 executed in the server 300, described above with reference to the software configuration of the server 300, makes a setup related to the image forming operation, and manages and operates the output format data generation module 12n in a collective manner is a feature in implementing the image forming function of the image forming system 1 according to this embodiment.

Figure 8:
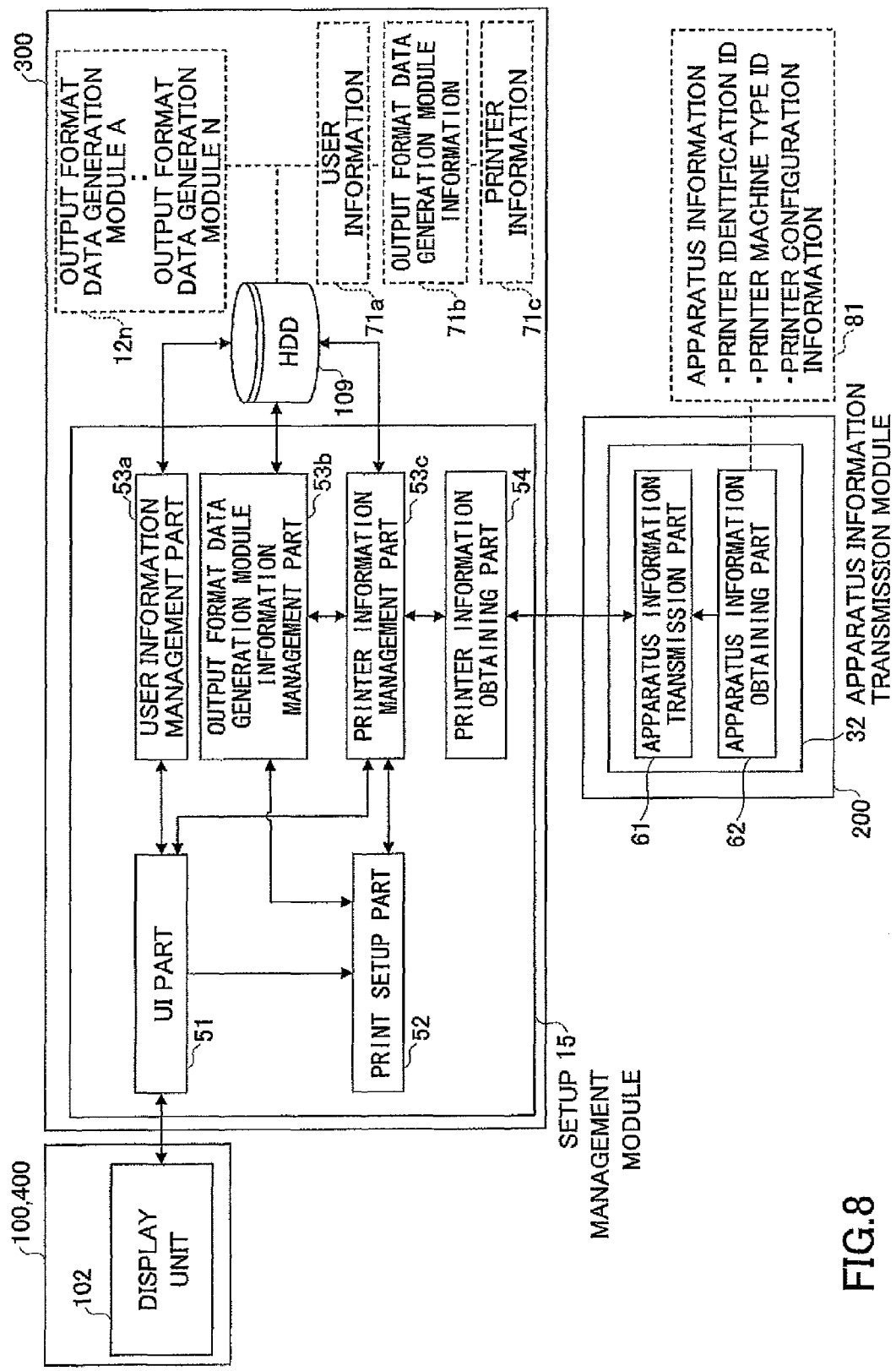
FIG. 8 is a block diagram illustrating a functional configuration of the image forming system according to the embodiment of the present invention.

Based on the above-described feature, a description is given, with reference to FIG. 8, of a configuration of each of functional parts implementing various setup functions for controlling an image forming operation (hereinafter referred to as "operation control setup functions") in the "image forming function" of the image forming system 1 according to this embodiment. FIG. 8 is a block diagram illustrating a functional configuration of the image forming system according to this embodiment of the present invention.

(Outline of Operation Control Setup Functions)

According to the image forming system 1 of this embodiment, in order to manage and operate the output format data generation module 12n in a collective manner, the server 300 includes a UI part 51, a print setup part 52, a user information management part 53a, an output format data generation module information management part 53b, a printer information management part 53c, and a printer information obtaining part 54; and the printer 200 includes an apparatus information transmission part 61 and an apparatus information obtaining part 62.

The above-described functional parts 51, 52, 53a, 53b, 53c, and 54 of the server 300 according to this embodiment are functions implemented by execution of the setup management module 15. Further, the above-described functional parts 61 and 62 of the printer 200 according to this embodiment are functions implemented by execution of the apparatus information transmission module 32 described above with reference to the software configuration of the printer 200. A further description is given below of each of the functional parts described above.

The UI part 51 of the server 300 is a function that provides a UI function that enables determining the setting values of various settings of the printer 200 for controlling an image forming operation to a user through the display unit 102 of a user terminal such as the client 100 or the client 400.

The print setup part 52 is a function that sets various setting values received through the UI part 51 as control parameters for the image forming operation (such as the name of the output format data generation module 12n to be used and the network address value of a transmission destination).

The user information management part 53a is a function that manages user information 71a described below with reference to FIG. 14. The user information 71a correlates a user with one or more printers 200 that the user can specify as a printing destination.

The output format data generation module information management part 53b is a function that manages output format data generation module information 71b described below with reference to FIG. 10. The output format data generation module information 71b correlates the printer 200 with the corresponding output format data generation module 12n.

The printer information management part 53c is a function that manages printer information 71c described below with reference to FIGS. 12A and 12B. The printer information 71c is composed of apparatus information 81 of the printer 200.

These three information management parts 53a, 53b, and 53c manage the corresponding information 71a, 71b, and 71c contained in a predetermined storage area of the HDD 109 by reading or updating it as required.

The printer information obtaining part 54 is a function that obtains the apparatus information from the printer 200.

The apparatus information transmission part 61 of the printer 200 is a function that transmits its apparatus information 81 to the server 300.

The apparatus information obtaining part 62 is a function that obtains the apparatus information 81 from the printer 200. The apparatus information 81 obtained by the apparatus information obtaining part 62 includes identification information for identifying the printer 200 (hereinafter referred to as "printer identification ID (identifier)"), machine type identification information for identifying the machine type of the printer 200 (hereinafter referred to as "printer machine type ID"), and printer configuration information such as information on the optional units of the printer 200 (such as a "duplex (printing) unit" and a "large capacity tray (LCT)"). Further, the apparatus information 81 also includes management information base (MIB) information that is made public by the printer 200 in order to notify external apparatuses of the status of the printer 200.

In the following, a specific description is given of operations of the above-described functional parts in the situation where a user's instruction is accepted through the UI part 51 and various setups for controlling an image forming operations are made in accordance with the accepted instruction in the image forming system 1 according to this embodiment.

(Installation of Output Format Data Generation Module)

According to the image forming system 1 of this embodiment, for example, an administrator pre-installs the output format data generation module 12n that generates plotter output format data corresponding to the printer 200 in the server 300 in accordance with the print service provided to users by the system 1, and stores the output format data generation module 12n in a predetermined storage area of the HDD 109. Instead of the administrator installing the output format data generation module 12n, for example, the server 300 may periodically access a download server managed by a software vendor, where the output format data generation module 12n is retained, and automatically download and install a module necessary for updating or necessary to be newly added.

Figure 9:
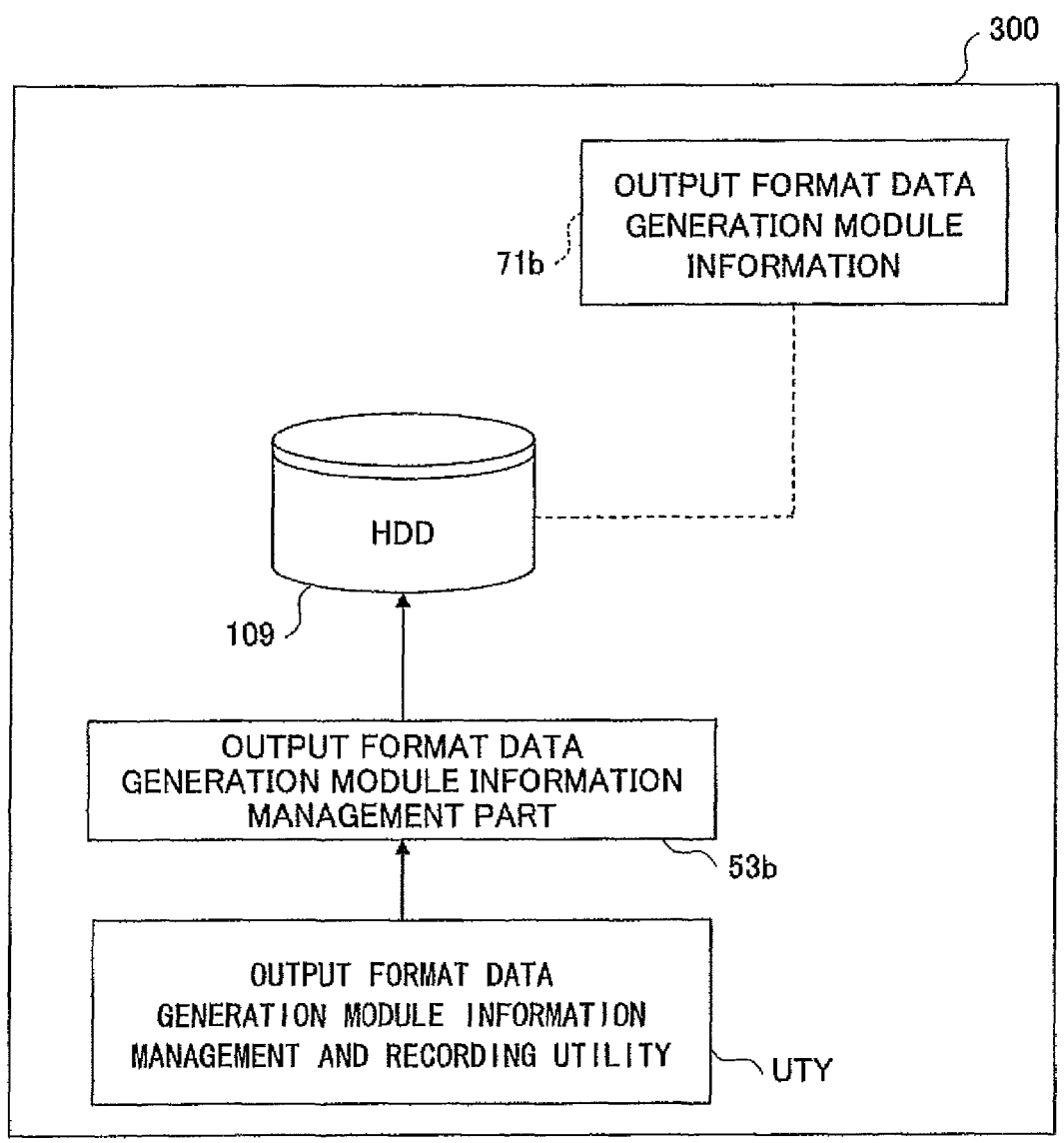
FIG. 9 is a diagram illustrating an operation of installing an output format data generation module according to the embodiment of the present invention.

At the time of thus installing the output format data generation module 12n, the image forming system 1 causes the output format data generation module information management part 53b to record in the server 300 various information items for managing the output format data generation module 12n to be installed as illustrated in the operation example of FIG. 9.

FIG. 9 is a diagram illustrating an operation of installing the output format data generation module 12n according to this embodiment.

As illustrated in FIG. 9, the server 300 causes an output format data generation module information management and recording utility UTY to pass the machine type identification ID of the printer 200 to which the output format data generation module 12n to be installed corresponds, the name of the output format data generation module 12n (hereinafter referred to as "generation module name"), the version of the output format data generation module 12n, to the output format data generation module information management part 53b, and to instruct the output format data generation module information management part 53b to record the passed information in a management table. The output format data generation module information management and recording utility UTY is not the setup management module 15 but is a software component included in an installer (installation program) that installs the output format data generation module 12n. At the time of executing the installation, the output format data generation module information management and recording utility UTY is automatically started to instruct the output format data generation module information management part 53b to record the values of the above-described information.

As a result, the output format data generation module information management part 53b sets the values of the information received from the output format data generation module information management and recording utility UTY in, for example, corresponding information items of the output format data generation module information 71b managed in a table format as illustrated in FIG. 10.

FIG. 10 shows a data configuration of the output format data generation module information 71b according to this embodiment. As illustrated in FIG. 10, the data of the output format data generation module information 71b include, for example, three information items of PRINTER MACHINE TYPE ID, GENERATION MODULE NAME, and VERSION, and are contained in a predetermined data format in the HDD 109 of the server 300.

This data configuration makes it possible to select and determine, based on the machine type ID of the printer 200 specified as a printing destination, one of the multiple output format data generation modules 12n installed in the server 300 which one generates appropriate plotter output format data (data interpretable by the plotter 25 of the specified printer 200).

For example, if the output format data generation module information 71b is composed of values as illustrated in FIG. 10, it is possible to identify the output format data generation module 12n of a version "1.02" by a generation module name "GENERATION MODULE A" based on a printer machine type ID "abc1234."

FIG. 10 illustrates a table format as an example of the above-described predetermined data format, but the present invention is not limited to this format. When consideration is given in terms of the product configuration of the printer 200, since the output format data generation module 12n corresponds to each machine type the same as the printer driver PD or the print data parser DP, the data format may be any format as long as each machine type is correlated with various information items for identifying the corresponding output format data generation module 12n in the format.

(Recording of Printer)

According to the image forming system 1 of this embodiment, a corresponding one of the printers 200 connected to a telecommunications circuit is uniquely identified based on the printing destination specifying information specified by a user through a user terminal such as the client 100 or the client 400. That is, in order to transmit plotter output format data generated in accordance with a print request to the printer 200 specified as a printing destination, the specified printer 200 to serve as a data transmission destination (to which data are to be transmitted) is identified. Therefore, with respect to the printers 200 that can be selected as a printing destination in a print service provided, various information items for making it possible to uniquely specify each of the printers 200 are recorded in the server 300. Therefore, according to the image forming system 1, as illustrated in the operation example of FIG. 11, the server 300 collects the apparatus information 81 from each of the printers 200 that can be selected (specified) as a printing destination, and records the collected apparatus information 81 as various information items for identifying each printer 200.

Figure 11:
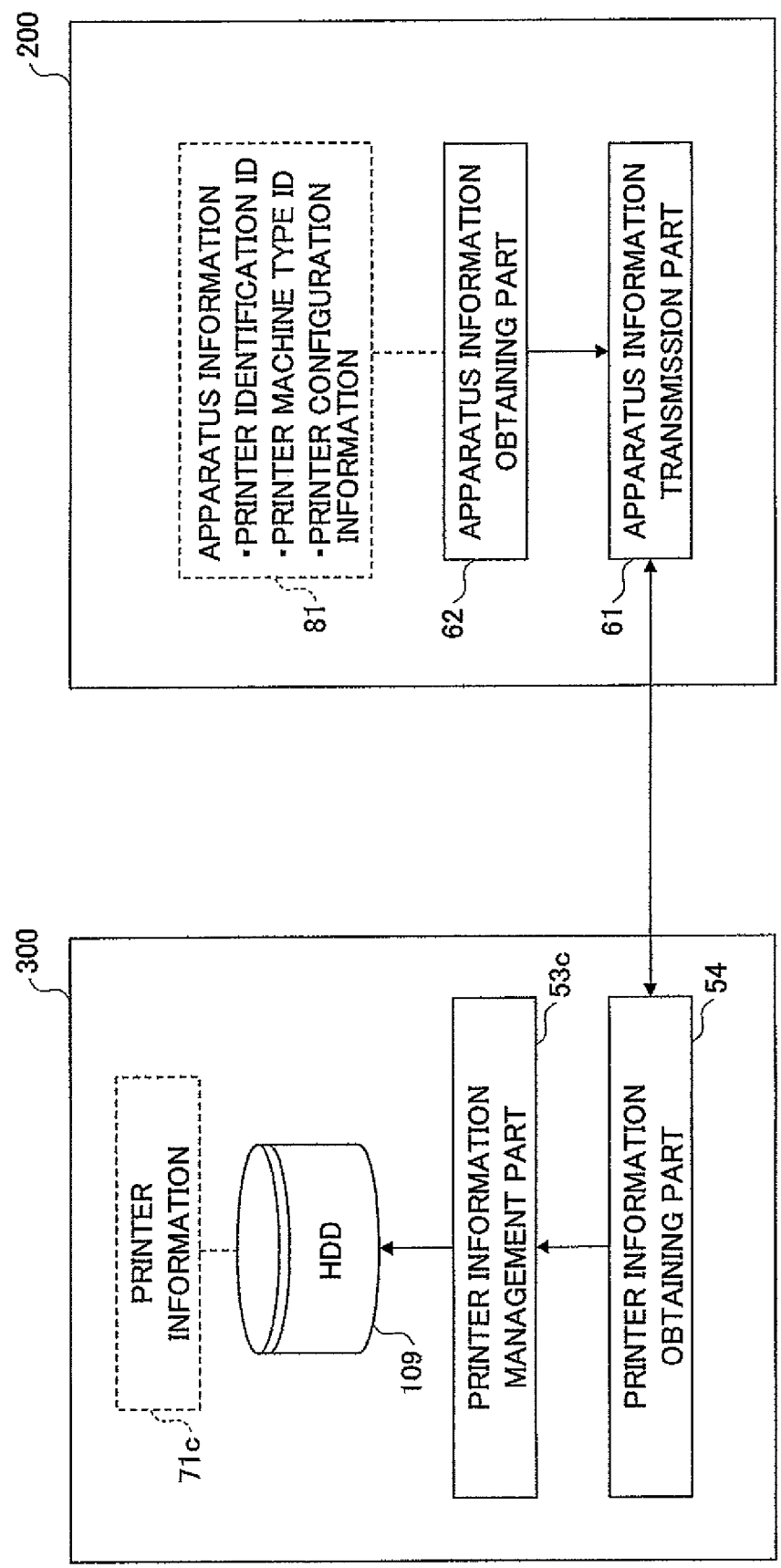
FIG. 11 is a block diagram illustrating an operation of recording and updating printer information managed by the server (management apparatus) according to the embodiment of the present invention.

FIG. 11 is a diagram illustrating an operation of recording and updating the printer information 71c managed by the server 300 according to this embodiment.

As illustrated in FIG. 11, the server 300 first receives the apparatus information 81 transmitted from the apparatus information transmission part 61 operating in the printer 200 in the printer information obtaining part 54. The apparatus information 81 includes the printer identification ID, the printer machine type ID, and the printer configuration information of the printer 200. In the printer 200, the apparatus information obtaining part 62 periodically collects the apparatus information 81 transmitted by the apparatus information transmission part 61.

The printer information obtaining part 54 may obtain the apparatus information 81 as follows. For example, the apparatus information 81 obtained by the apparatus information obtaining part 62 may be transmitted from the apparatus information transmission part 61 upon the printer 200 connecting to a telecommunications circuit to be received by the printer information obtaining part 54. Alternatively, the server 300 may cause the printer information obtaining part 54 to make a transmission request to the apparatus information transmission part 61 in response to the printer 200 connecting to a telecommunications circuit and to cause the apparatus information transmission part 61 to transmit the apparatus information 81 obtained by the apparatus information obtaining part 62 in accordance with the request, so that the printer information obtaining part 54 obtains the apparatus information 81.

As a result, the apparatus information 81 obtained by the printer information obtaining part 54 is passed to the printer information management part 53c. The printer information management part 53c sets the values of the apparatus information 81 in corresponding information items of the printer information 71c managed in, for example, a table format as illustrated in FIG. 12A or 12B.

FIGS. 12A and 12B show data configurations of the printer information 71c according to this embodiment.

As illustrated above with reference to the hardware configuration, the printer 200 according to this embodiment includes the data communications I/F 24 that can be assigned a global IP address. In this case, the printer 200 that can be specified (selected) as a printing destination can be uniquely identified by the global IP address assigned to the data communications I/F 24 of the printer 200.

In this case, the printer information management part 53c manages various information items for identifying the printers 200 based on, for example, the printer information 71c as illustrated in FIG. 12A. The data of the printer information 71c illustrated in FIG. 12A include, for example, three information items of NETWORK ADDRESS, PRINTER MACHINE TYPE ID, and PRINTER CONFIGURATION INFORMATION, and are contained in a predetermined data format in the HDD 109 of the server 300.

When the apparatus information 81 is obtained from the printers 200 by the printer information obtaining part 54, the printer information management part 53c sets the value of the global IP address assigned to the data communications I/F 24 in the network address information item. Further, the printer information management part 53c sets the values of the printer machine type ID and the printer configuration information included in the received apparatus information 81 in the corresponding information items.

However, all printers 200 may not necessarily have the data communications I/F 24 that can be assigned a global IP address in the image forming system 1 according to this embodiment. If the printer 200 includes the data communications I/F 24 that can be assigned a common IP address (an IPv4-compliant network address) as in this case, the assigned IP address is a local address. Accordingly, unlike in the case of the global IP address, the printer 200 cannot be uniquely identified without a limitation to a particular area.

In this case, the printer information management part 53c manages various information items for identifying each printer 200 based on, for example, the printer information 71c as illustrated in FIG. 12B. The data of the printer information 71c illustrated in FIG. 12B include, for example, four information items of NETWORK ADDRESS, PRINTER IDENTIFICATION ID, PRINTER MACHINE TYPE ID, and PRINTER CONFIGURATION INFORMATION, and are contained in a predetermined data format in the HDD 109 of the server 300. In the data configuration illustrated in FIG. 12B, the printer identification ID is managed as information for specifying the printer 200 in place of the global IP address illustrated in FIG. 12A.

When the apparatus information 81 is obtained from the printer 200 by the printer information obtaining part 54, the printer information management part 53c sets the value of the IP address assigned to the data communications I/F 24 in the network address information item. Further, the printer information management part 53c sets the values of the printer identification ID, the printer machine type ID, and the printer configuration information in the corresponding information items.

This data configuration makes it possible to select and determine the printer 200 specified as a printing destination from multiple printers 200 whose data are recorded in the server 300 and can be specified as a printing destination, based on information on the global IP address assigned to the printer 200 specified as a printing destination or its printer identification ID, and to identify the related network address, printer machine type ID, and printer configuration information.

For example, if the printer information 71c is composed of values as illustrated in FIG. 12A, the printer 200 with a duplex unit, whose printer machine type ID is "abc1234," can be identified based on the network address (global IP address) "123:2345:90:ab:cdef::3494:0076." Further, if the printer information 71c is composed of values as illustrated in FIG. 12B, the printer 200 with a duplex unit, whose printer machine type ID is "abc1234" and whose assigned network address (IP address) is "192.168.8.76," can be identified based on the printer identification ID "12345678a."

FIGS. 12A and 12B illustrate table formats as examples of the above-described predetermined data format, but the present invention is not limited to this format. The data format may be any format as long as each printer 200 is correlated with various information items for identifying it in the format.

(Recording of Printers that can be Specified for Each User)

According to the image forming system 1 of this embodiment, the UI part 51 (FIG. 8) provides a user with a UI function that enables setting (determining) the setting values of various settings (setups) of the printer 200 for controlling an image forming operation. The setting values that can be set (determined) by the user include a global IP address or a printer identification ID as printing destination specifying information that specifies a printing destination. The UI part 51 displays one or more printing destination specifying information candidates that can be specified (selected) by the user (hereinafter referred to as "specifiable printing destination information") on the display unit 102 (FIG. 3) of a user terminal such as the client 100 or the client 400.

In order to cause the UI part 51 to operate in the above-described manner, one or more specifiable printing destination information items displayed as specification candidates by the UI part 51 are managed. According to the image forming system 1, the specifiable printing destination information is managed in a data format as illustrated in FIG. 14 in the server 300.

According to the image forming system 1 of this embodiment, the specifiable printing destination information managed by the server 300 may be recorded as follows. For example, as illustrated in the example recording processing of FIG. 13, the global IP address or the printer identification ID entered through the UI function may be recorded as specifiable printing destination information. Alternatively, as illustrated in the example recording processing of FIG. 15, a search for corresponding printers 200 may be conducted using predetermined search criteria as a key, and the specifiable printing destination information may be recorded in accordance with the search results. By way of example, a description is given below of the above-described two methods.

(In Case of Recording Specifiable Printing Destination Information by Direct Entry)

FIG. 13 is a sequence diagram illustrating a first example of recording the specifiable printing destination information on a user-by-user basis according to this embodiment. FIG. 13 shows recording processing in the case where the printing destination specifying information entered through the UI function is a printer identification ID.

As illustrated in FIG. 13, first, in step S101, the server 300 according to this embodiment waits until the UI part 51 provides a UI function that enables entry of a user ID, which is information for identifying a user, and a printer identification ID and the values of the respective information items are entered (accepted).

In step S102, in response to acceptance of the values of the respective information items by the UI part 51, the server 300 causes the entered values of the user ID and the printer identification ID to be passed to the user information management part 53a.

In response to acquisition of the values of the user ID and the printer identification ID by the user information management part 53a in step S103, in step S104, the server 300 sets and records the obtained values of the respective information items in corresponding information items (entries) of the user information 71a contained in a predetermined storage area of the HDD 109, thereby updating the user information 71a.

FIG. 14 shows a data configuration of the user information 71a according to this embodiment. The server 300 manages the specifiable printing destination information by, for example, the user information 71a in a table format as illustrated in FIG. 14. The data of the user information 71a illustrated in FIG. 14 include, for example, three information items of USER ID, RECORDED PRINTER IDENTIFICATION ID, AND SELECTED PRINTER IDENTIFICATION ID (the printer identification ID of a currently selected printer), and are contained in a predetermined format in the HDD 109 of the server 300.

This data configuration makes it possible to identify specifiable printing destination information correlated with a user and managed in the server 300 based on her/his user ID.

For example, if the user information 71a is composed of values as illustrated in FIG. 14, it is possible to identify, based on a user ID "user01@abc.bb.cc," printer identification IDs "12345678a" and "12345678b" that are printing destination specifying information that can be specified by the corresponding user.

FIG. 14 illustrates a data configuration where the user ID and the printer identification ID are correlated, but the present invention is not limited to this data configuration. For example, the global IP address may be used in place of the printer identification ID. The data configuration may be any configuration as long as the configuration is such that the user ID is correlated with information that uniquely identifies one or more printers that the corresponding user can specify or select as a printing destination.

Based on the above-described data configuration of the user information 71a, a more specific description is given of the information recording processing of step S104 described above.

The user information management part 53a searches the user information 71a using the acquired user ID as a key, and determines from the search result whether the user who has given the instruction to record the printing destination specifying information has been recorded in the user information 71a.

Next, in response to determining from the search result that the user has been recorded, the user information management part 53a searches the information item of RECORDED PRINTER IDENTIFICATION ID correlated with the user using the acquired printer identification ID as a key, and determines from the search result whether the printer identification ID to be recorded has been recorded. If the user information management part 53a determines from the search result that the printer identification ID to be recorded has not been recorded, the user information management part 53a sets and records the acquired value of the printer identification ID, and sets the set and recorded value of the printer identification ID in the information item of SELECTED PRINTER IDENTIFICATION ID.

Further, if the user information management part 53a determines from the search result that the user has not been recorded in the user information 71a, the user information management part 53a creates a new user data area in the user information 71a, and sets and records the acquired values of the user ID and the printer identification ID in corresponding information items. At this point, the user information management part 53a sets the value of the printer identification ID set and recorded in the information item of RECORDED PRINTER IDENTIFICATION ID in SELECTED PRINTER IDENTIFICATION ID.

The server 300 records the specifiable printing destination information in the user information 71a through the above-described processing of step S104 by the user information management part 53a.

Further, in step S105, the server 300 causes the UI part 51 to be notified of the result of recording the specifiable printing destination information and updating the user information 71a by the user information management part 53a. As a result, in step S106, the UI part 51 displays the recording and updating result of which the UI part 51 has been notified.

(In Case of Recording Specifiable Printing Destination Information Based on Search Results)

Since a user is not necessarily informed of the value of a global IP address or printer identification ID that is printing destination specifying information, the image forming system 1 according to this embodiment has the function of enabling extraction of a predetermined number of printing destination specifying information items based on search criteria.

Figure 15:
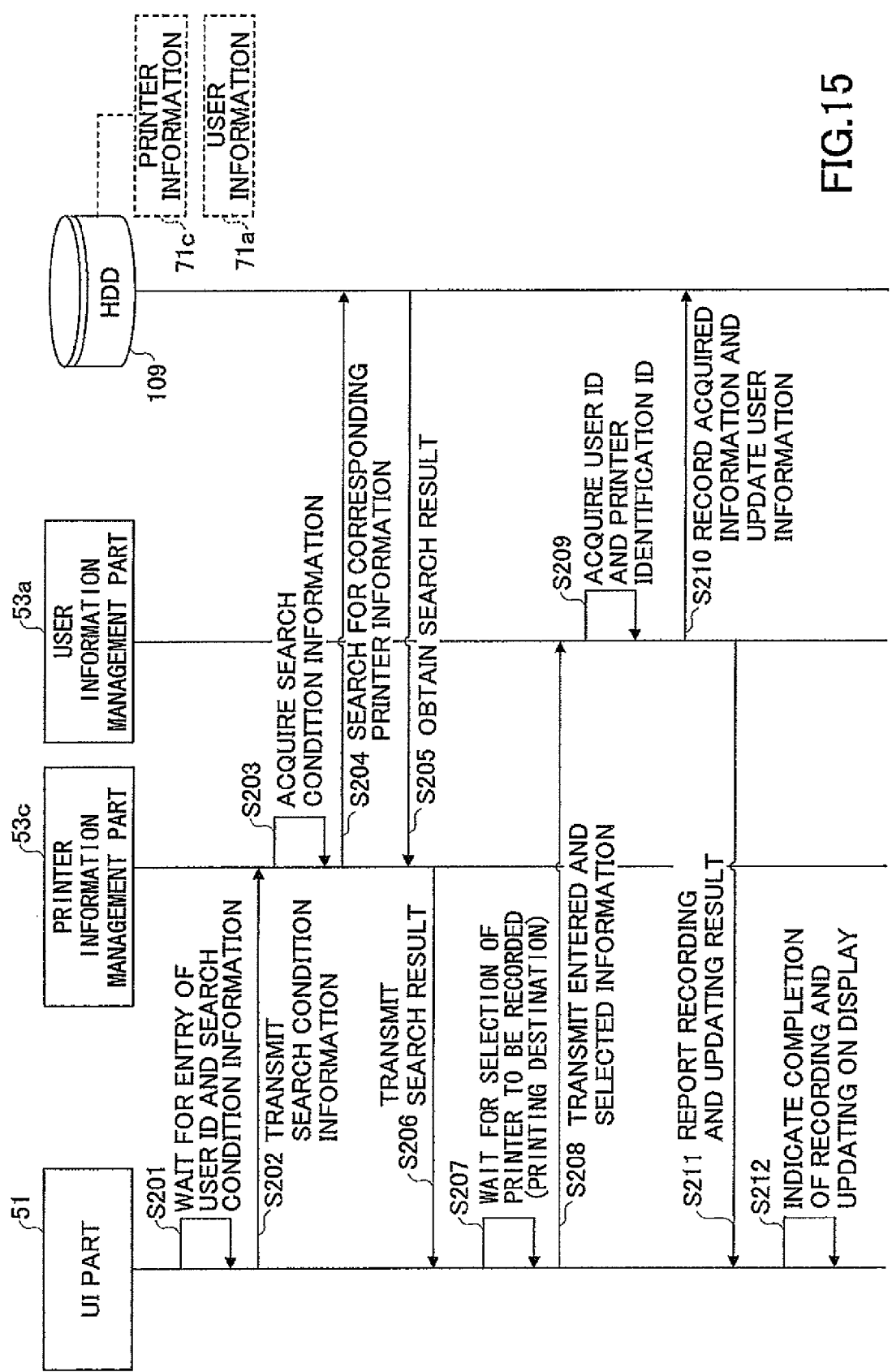
FIG. 15 is a sequence diagram illustrating a second example of recording specifiable printing destination information on a user-by-user basis according to the embodiment of the present invention.

FIG. 15 is a sequence diagram illustrating a second example of recording the specifiable printing destination information on a user-by-user basis according to this embodiment. Like FIG. 13, FIG. 15 shows recording processing in the case where the printing destination specifying information selected through the UI function is a printer identification ID.

As illustrated in FIG. 15, first, in step S201, the server 300 according to this embodiment waits until the UI part 51 provides a UI function that enables entry of a predetermined search condition (or term) and a user ID and the values of the above-described information items are entered (accepted). Examples of the predetermined search condition include feature information of a printer configuration, such as "a duplex unit" or "a large-capacity paper feed tray," and a printer machine type ID.

In step S202, in response to acceptance of the values of the above-described information items by the UI part 51, the server 300 causes the entered value of the search condition information to be passed to the printer information management part 53c.

In response to acquisition of the value of the search condition information by the printer information management part 53c in step S203, in step S204, the server 300 searches the information items of the printer information 71c contained in a predetermined storage area of the HDD 109 using the acquired value of the search condition information as a key. In step S205, the server 300 obtains the printer identification ID value of a corresponding one or more of the printers 200 recorded in the printer information 71c as a search result.

In step S206, in response to the printer information management part 53c obtaining the search result, the server 300 causes the printer identification ID values that are the obtained search result to be passed to the UI part 51.

In step S207, the server 300 waits until the UI part 51 provides a UI function that enables selection and indication of printing destination specifying information to be recorded from a list of the printer identification ID values displayed as printing destination specification candidates and the value(s) of the printing destination specifying information is (are) selected (accepted).

In step S208, in response to acceptance of the values of the printing destination specifying information by the UI part 51, the server 300 causes the values of the user ID entered in step S201 and the accepted printer identification ID to be passed to the user information management part 53a.

In response to acquisition of the values of the user ID and the printer identification ID by the user information management part 53a in step S209, in step S210, the server 300 sets and records the obtained values of the respective information items in corresponding information items (entries) of the user information 71a contained in a predetermined storage area of the HDD 109, thereby updating the user information 71a.

In step S211, the server 300 causes the UI part 51 to be notified of the result of recording the specifiable printing destination information and updating the user information 71a by the user information management part 53a. As a result, in step S212, the UI part 51 displays the recording and updating result of which the UI part 51 has been notified.

According to the image forming system 1 of this embodiment, the specifiable printing destination information of each user is recorded, and is managed and operated (manipulated) in the server 300 by at least one of the above-described procedures.

(Selection and Determination of Generation Module According to Printing Destination Specification and Setting of Transmission Destination Information [Network Address] of Generated Data)

According to the image forming system 1 of this embodiment, information on various settings (setups) for controlling an image forming operation (hereinafter referred to as "operation control setup information") is recorded and set in the server 300 to be managed in a collective manner by the above-described methods.

The image forming system 1 selects and determines an appropriate one of multiple output format data generation modules 12n installed which one corresponds to the printer 200 specified as a printing destination, generates plotter output format data using the determined output format data generation module 12n, and thereafter transmits the generated plotter output format data in accordance with a network address that is transmission destination information, thereby implementing a user desired image forming operation.

For this, in the image forming system 1, the selection and determination of the output format data generation module 12n used in the above-described image forming operation and the setting of the network address (a transmission destination) used in the above-described image forming operation are performed based on the above-described various settings (setups) information items (the user information 71a, the output format data generation module information 71b, and the printer information 71c). A description is given below of how the image forming system 1 uses the operation control setup information in making the above-described settings (setups).

FIG. 16 is a sequence diagram illustrating an example of setting the output format data generation module 12n and the transmission destination information (network address) of generated data according to this embodiment. FIG. 15 illustrates setting processing in the case where the printing destination specifying information entered through the UI function is a printer identification ID.

As illustrated in FIG. 16, in step S301, the server 300 according to this embodiment waits until the UI part 51 provides a UI function that enables entry of a user ID for identifying a user and the value of the above-described information item (user ID) is entered (accepted).

In step S302, in response to acceptance of the value of the information item by the UI part 51, the server 300 causes the entered value of the user ID to be passed to the user information management part 53a.

In step S303, in response to acquisition of the value of the user ID by the user information management part 53a, the server 300 refers to the user information 71a contained in a predetermined storage area of the HDD 109 based on the acquired value of the user ID, and obtains one or more printer identification ID values recorded as specifiable printing destination information correlated with the user ID from a corresponding information item.

In step S304, in response to the user information management part 53a obtaining the printer identification ID values, the server 300 causes the obtained printer identification ID values to be passed to the UI part 51.

In step S305, the server 300 waits until the UI part 51 provides a UI function that enables selection and indication of the printing destination specifying information from a list of the printer identification ID values displayed as the printing destination specification candidates and the value of the printing destination specifying information is entered (accepted).

In step S306, in response to acceptance of the value of the printing destination specifying information by the UI part 51, the server 300 causes the accepted printer identification ID to be passed to the printer information management part 53c.

In step S307, in response to acquisition of the printer identification ID value by the printer information management part 53c, the server 300 refers to the printer information 71c (FIG. 12B) contained in a predetermined storage area of the HDD 109 based on the acquired printer identification ID value, and obtains the values of the network address, printer machine type ID, and printer configuration information recorded in correlation with the printer identification ID from corresponding information items.

In step S308, in response to the printer information management part 53c obtaining the values of the network address, printer machine type ID, and printer configuration information, the server 300 causes the obtained values of the printer machine type ID and the printer configuration information to be passed to the print setup part 52.

In step S309, the server 300 causes the print setup part 52 to pass the printer machine ID value to the output format data generation module information management part 53b. Then, in step S310, the output format data generation module information management part 53b refers to the output format data generation module information 71b contained in a predetermined storage area of the HDD 109 based on the received printer machine type ID value, and obtains the values of the generation module name and the version correlated with the printer machine type ID.

In step S311, in response to the output format data generation module information management part 53b obtaining the values of the generation module name and the version, the server 300 causes the obtained values of the generation module name and the version to be passed to the print setup part 52.

In step S312, the server 300 causes the print setup part 52 to select and determine, based on the values of the generation module name and the version, one of the output format data generation modules 12n installed in the server 300 which one is to be used at the time of an image forming operation and to set the determined output format data generation module 12n in control parameters. Further, the print setup part 52 sets the network address obtained in step S308 in control parameters as a transmission destination to which plotter output format data are to be transmitted.

According to the image forming system 1 of this embodiment, selection and determination of and setting of the output format data generation module 12n corresponding to the printer 200 specified as a printing destination and setting of the transmission destination of plotter output format data to be generated are thus performed in order to implement a user-desired image forming operation.

That is, according to the image forming system 1, it is possible to construct an image forming operation environment simpler than that which is conventionally used, as described below, based on, for example, the output format data generation module information 71b and the printer information 71c managed by the server 300 through the setup management module 15.

(Example Procedure for Constructing Image Forming Operation Environment)

(a) Connect a network cable to the data communications I/F 24 of the printer 200.

(b) The data communications I/F 24 detects a network and connects to the server 300.

(c) The server 300 selects and determines the output format data generation module 12n corresponding to the printer 200 based on a printer identification ID acquired from the printer 200 (correlating the printer 200 with an appropriate output format data generation module 12n).

As a result, it is possible to provide a print service that generates appropriate plotter output format data and prints the data from a specified printer 200 in response to a user's specification of a printing destination.

As described above, according to the image forming system 1 of this embodiment, the output format data generation module 12n that causes the printer driver PD generating print data from application data and the print data parser PD interpreting the print data and generating plotter output format data of a data format interpretable by a printer engine to operate as a single function is correlated with one or more printers 200 specifiable as a printing destination and is managed in the single server 300.

According to the image forming system 1 of this embodiment, the server 300 accepts a user's print request; selects and determines, based on the accepted print request, an appropriate one of one or more managed output format data generation modules 12n which one corresponds to the printer 200 specified as a printing destination; generates plotter output format data from application data using the determined output format data generation module 12n; and transmits the generated plotter output format data to the printer 200.

Thus, according to the image forming system 1 of this embodiment, the printer driver PD and the print data parser DP, which are conventionally managed and operated in different apparatuses, are combined into a single function to be managed and operated collectively. This enables an administrator to prevent an occurrence of printing failure due to a difference in the combination of software components and to reduce workload in, for example, upgrading the image forming function. This also enables a user to receive a print service by specifying a printing destination without installation work, thus making it possible to provide an image forming function that is highly usable to each of the user and the administrator.

The "image forming function" of the image forming system 1 according to this embodiment may be implemented by executing the processing procedures illustrated in, for example, FIG. 13, FIG. 15, and FIG. 16 in a computer as programs coded in a programming language suited to the operating environments of the server 300 (management apparatus) and the printer 200 (image forming apparatus) of the image forming system 1 according to this embodiment. Therefore, the image forming programs of the image forming system 1 according to this embodiment may be stored in the computer-readable recording media 104 (FIG. 3) and 204 (FIG. 4).

Therefore, by storing the image forming programs according to this embodiment in the recording media 104 and 204 such as floppy (registered trademark) disks, compact disks (CDs), and digital versatile disks (DVDs), the image forming programs can be installed into the server 300 and the printer 200, which are components of the image forming system 1, from these recording media 104 and 204 loaded into (connected to) the drive units 103 (FIG. 3) and 203 (FIG. 4) that can read the recording media 104 and 204. Further, since the server 300 and the printer 200 have their respective interface units 108 (FIG. 3) and 209 (FIG. 4), the image forming programs may be downloaded to and installed into the server 300 and the printer 200 through a telecommunications circuit such as the Internet.

Further, in this embodiment, a description is given of a processing procedure that is triggered by specification of a printer identification ID through the UI function provided by the UI part 51 in each of FIG. 13, FIG. 15, and FIG. 16. However, the trigger may be specification of any information that can uniquely identify each printer 200 managed and operated by the image forming system 1, such as a global IP address as illustrated in the printer information 71c of FIG. 12A.

According to one embodiment of the present invention, there is provided an image forming system including one or more image forming apparatuses; and a management apparatus configured to manage and operate the image forming system, to receive a print request transmitted from an information processor, and to instruct, in accordance with the print request, one of the image forming apparatuses specified as a printing destination to perform a predetermined image forming operation, wherein the management apparatus includes: a storage unit; a software component retention part configured to retain one or more software components in a predetermined storage area of the storage unit, the software components each being configured to generate output format data in a data format interpretable by a printer engine of a corresponding one or more of the image forming apparatuses from application data; a determination part configured to determine, based on the one of the image forming apparatuses specified as the printing destination, one of the software components retained in the storage unit to be used to generate the output format data corresponding to the one of the image forming apparatuses specified as the printing destination; and a transmission part configured to transmit the output format data generated by the determined one of the software components to the one of the image forming apparatuses specified as the printing destination, and the one of the image forming apparatuses specified as the printing destination includes an image forming part configured to form a predetermined image on an image forming medium based on the output format data transmitted from the transmission part of the management apparatus.

Thus, according to an image forming system of one embodiment of the present invention, a software component that causes a print data generating function to generate print data from application data and an output format data generating function to interpret the print data and generate output format data in a data format interpretable by a printer engine to operate as a single function is correlated with one or more image forming apparatuses specifiable as a printing destination and is managed in a single management apparatus.

As a result, according to the image forming system, the management apparatus accepts a user's print request, selects and determines, in accordance with the accepted print request, an appropriate one of one or more managed software components corresponding to the image forming apparatus specified as a printing destination, generates output format data from application data using the determined one of the software components, and transmits the generated output format data to the image forming apparatus.

This configuration enables the image forming system to have the print data generating function and the output format data generating function, which are conventionally managed and operated in different apparatuses, put together into a single function to be managed and operated collectively, and to provide a highly usable image forming function to each of a user and the administrator.

According to one embodiment of the present invention, there is provided a management apparatus configured to manage and operate an image forming system, to receive a print request transmitted from an information processor, and to instruct, in accordance with the print request, one of one or more image forming apparatuses specified as a printing destination to perform a predetermined image forming operation, the management apparatus including: a storage unit; a software component retention part configured to retain one or more software components in a predetermined storage area of the storage unit, the software components each being configured to generate output format data in a data format interpretable by a printer engine of a corresponding one or more of the image forming apparatuses from application data; a determination part configured to determine, based on the one of the image forming apparatuses specified as the printing destination, one of the software components retained in the storage unit to be used to generate the output format data corresponding to the one of the image forming apparatuses specified as the printing destination; and a transmission part configured to transmit the output format data generated by the determined one of the software components to the one of the image forming apparatuses specified as the printing destination.

A management apparatus according to one embodiment of the present invention correlates a software component that causes a print data generating function to generate print data from application data and an output format data generating function to interpret the print data and generate output format data in a data format interpretable by a printer engine to operate as a single function with one or more image forming apparatuses specifiable as a printing destination, and manages the software component. The management apparatus accepts a user's print request, selects and determines, in accordance with the accepted print request, an appropriate one of one or more managed software components corresponding to the image forming apparatus specified as a printing destination, generates output format data from application data using the determined one of the software components, and transmits the generated output format data to the image forming apparatus.

Thus, the management apparatus can put together the print data generating function and the output format data generating function, which are conventionally managed and operated in different apparatuses, into a single function, and can manage and operate them collectively. Further, the management apparatus can construct an image forming environment in a flexible and simplified manner by adding or deleting the software component. Further, in consideration of recent improvement of the performance of information processors, although depending on the hardware specifications of the management apparatus, the processing time can be expected to be shorter than conventionally because the processing up to generation of output format data from application data, which is conventionally performed between an information processor and an image forming apparatus, is executed in the single management apparatus.

According to one embodiment of the present invention, there is provided an image forming method in an image forming system including one or more image forming apparatuses; and a management apparatus configured to manage and operate the image forming system, to receive a print request transmitted from an information processor, and to instruct, in accordance with the print request, one of the image forming apparatuses specified as a printing destination to perform a predetermined image forming operation, the image forming method including the steps of: retaining one or more software components in a predetermined storage area of a storage unit of the management apparatus, the software components each being configured to generate output format data in a data format interpretable by a printer engine of a corresponding one or more of the image forming apparatuses from application data; determining, based on the one of the image forming apparatuses specified as the printing destination, one of the software components retained in the storage unit to be used to generate the output format data corresponding to the one of the image forming apparatuses specified as the printing destination; transmitting the output format data generated by the determined one of the software components to the one of the image forming apparatuses specified as the printing destination; and forming a predetermined image on an image forming medium based on the output format data transmitted by said step of transmitting.

According to an image forming method of one embodiment of the present invention, a software component that causes a print data generating function to generate print data from application data and an output format data generating function to interpret the print data and generate output format data in a data format interpretable by a printer engine to operate as a single function is correlated with one or more image forming apparatuses specifiable as a printing destination and is managed in a single management apparatus. The management apparatus accepts a user's print request, selects and determines, in accordance with the accepted print request, an appropriate one of one or more managed software components corresponding to the image forming apparatus specified as a printing destination, generates output format data from application data using the determined one of the software components, and transmits the generated output format data to the image forming apparatus.

Thus, according to the image forming method, the print data generating function and the output format data generating function, which are conventionally managed and operated in different apparatuses, are put together into a single function to be managed and operated collectively, so that it is possible to provide a highly usable image forming function to each of a user and the administrator.

According to one embodiment of the present invention, there is provided a computer-readable recording medium storing a program for causing a computer to execute an image forming method in a management apparatus configured to manage and operate the image forming system, to receive a print request transmitted from an information processor, and to instruct, in accordance with the print request, one of one or more image forming apparatuses specified as a printing destination to perform a predetermined image forming operation, the image forming method including the steps of: retaining one or more software components in a predetermined storage area of a storage unit of the management apparatus, the software components each being configured to generate output format data in a data format interpretable by a printer engine of a corresponding one or more of the image forming apparatuses from application data; determining, based on the one of the image forming apparatuses specified as the printing destination, one of the software components retained in the storage unit to be used to generate the output format data corresponding to the one of the image forming apparatuses specified as the printing destination; and transmitting the output format data generated by the determined one of the software components to the one of the image forming apparatuses specified as the printing destination.

The program stored in the computer-readable recording medium enables a software component that causes a print data generating function to generate print data from application data and an output format data generating function to interpret the print data and generate output format data in a data format interpretable by a printer engine to operate as a single function to be correlated with one or more image forming apparatuses specifiable as a printing destination and be managed in a single computer, and enables the computer to function to accept a user's print request, select and determine, in accordance with the accepted print request, an appropriate one of one or more managed software components corresponding to the image forming apparatus specified as a printing destination, generate output format data from application data using the determined one of the software components, and transmit the generated output format data to the image forming apparatus.

This makes it possible to provide a highly usable image forming function to each of a user and the administrator.

According to one embodiment of the present invention, there is provided an image forming apparatus configured to form a predetermined image on an image forming medium, the image forming apparatus including a communications part configured to perform two-way data communications between an external apparatus and the image forming apparatus; an image forming part configured to form the predetermined image on the image forming medium; and a control part configured to control each of drive members for driving the image forming part.

An image forming apparatus according to one embodiment of the present invention receives output format data in a data format interpretable by its printer engine, transmitted from an external apparatus, and controls each drive member for driving the printer engine to form a predetermined image on an image forming medium.

Thus, according to the image forming apparatus, it is possible to implement an image forming function with a minimum functional configuration necessary to perform an image forming operation. As a result, it is possible to configure the image forming apparatus with cheaper hardware and to implement functions in a shorter development time than conventionally.

Additionally, the image forming apparatus may further include an image forming apparatus information transmission part configured to obtain and transmit image forming apparatus information, the image forming apparatus information being information related to the image forming apparatus and including apparatus identification information for identifying the image forming apparatus and machine type identification information for identifying a machine type of the image forming apparatus.

According to one embodiment of the present invention, there is provided a computer-readable recording medium storing a program for causing a computer to execute an image forming method in an image forming apparatus configured to form a predetermined image on an image forming medium, the image forming method including the steps of: performing two-way data communications between an external apparatus and the image forming apparatus; forming the predetermined image on the image forming medium; and controlling each of drive members for driving the image forming part.

The program stored in the computer-readable recording medium enables a computer to function to receive output format data in a data format interpretable by its printer engine, transmitted from an external apparatus, and control each drive member for driving the printer engine to form a predetermined image on an image forming medium.

This makes it possible to provide a highly usable image forming function to each of a user and the administrator.

The present invention is not limited to the specifically disclosed embodiment(s), and variations and modifications may be made without departing from the scope of the present invention.

The present application is based on Japanese Priority Patent Application No. 2008-019726, filed on Jan. 30, 2008, the entire contents of which are hereby incorporated by reference.

What is claimed is:

1. An image forming system, comprising:
one or more image forming apparatuses; and
a management apparatus configured to manage and operate the image forming system, to receive a print request transmitted from an information processor, and to instruct, in accordance with the print request, one of the image forming apparatuses specified as a printing destination to perform a predetermined image forming operation,
wherein the management apparatus includes
a storage unit;
a software component retention part configured to retain one or more software modules in a predetermined storage area of the storage unit, the software modules each including a first software component configured to generate print data from application data and a second software component configured to generate output format data in a data format interpretable by a corresponding one or more of the image forming apparatuses by parsing the print data, wherein the first and second software components are configured to be installed or uninstalled by adding or deleting the software module including the first and second software components;
a determination part configured to determine, based on the one of the image forming apparatuses specified as the printing destination, one of the software components retained in the storage unit to be used to generate the output format data corresponding to the one of the image forming apparatuses specified as the printing destination; and
a transmission part configured to transmit the output format data generated by the determined one of the software components to the one of the image forming apparatuses specified as the printing destination, and
the one of the image forming apparatuses specified as the printing destination includes
an image forming part configured to generate bitmap image data by interpreting the output format data transmitted from the transmission part of the management apparatus, and to form a predetermined image on an image forming medium based on the generated bitmap image data.

2. The image forming system as claimed in claim 1, wherein:
the management apparatus further comprises an information retention part configured to retain image forming apparatus information and software module information in a predetermined storage area of the storage unit, the image forming apparatus information being information related to the image forming apparatuses where apparatus identification information for identifying the image forming apparatuses and machine type identification information for identifying machine types of the image forming apparatuses are correlated, the software module information being information related to the software modules where the machine type identification information and software module identification information for identifying the software modules are correlated,
the determination part is configured to refer to the image forming apparatus information based on the apparatus identification information of the one of the image forming apparatuses specified as the printing destination, and thereby to obtain the machine type identification information correlated with said apparatus identification information, and
the determination part is configured to refer to the software module information based on the obtained machine type identification information and obtain the software module identification information correlated with the obtained machine type identification information, and to determine, based on the obtained software module identification information, the one of the software modules to be used to generate the output format data corresponding to the one of the image forming apparatuses specified as the printing destination.

3. The image forming system as claimed in claim 2, wherein the transmission part is configured to, in response to the apparatus identification information being specified as the printing destination, refer to the image forming apparatus information based on the apparatus identification information and obtain transmission destination information correlated with the apparatus identification information, the transmission destination information being information related to a transmission destination of the output format data, and to transmit the output format data generated using the determined one of the software modules to the one of the image forming apparatuses specified as the printing destination in accordance with the obtained transmission destination information.

4. The image forming system as claimed in claim 2, wherein the transmission part is configured to, in response to the one of the image forming apparatuses specified as the printing destination including a communications unit assigned a global IP address, the apparatus identification information being the global IP address, and the apparatus identification information being specified as the printing destination, transmit the output format data generated using the determined one of the software modules to the one of the image forming apparatuses specified as the printing destination in accordance with the global IP address.

5. The image forming system as claimed in claim 2, wherein the management apparatus further comprises an apparatus information obtaining part configured to obtain apparatus information from the image forming apparatuses, and
the management apparatus updates the image forming apparatus information based on the obtained apparatus information.

6. The image forming system as claimed in claim 2, wherein the information retention part is configured to retain user information in a predetermined storage area of the storage unit, the user information being information related to one or more users of the image forming system where user identification information for identifying the users and the apparatus identification information are correlated, and
the management apparatus is configured to, in response to receiving the print request transmitted from the information processor, identify one of the users who has made the print request based on the user information and display the apparatus identification information correlated with the identified one of the users as specification candidate information of the printing destination.

7. A management apparatus configured to manage and operate an image forming system, to receive a print request transmitted from an information processor, and to instruct, in accordance with the print request, one of one or more image forming apparatuses specified as a printing destination to perform a predetermined image forming operation, the management apparatus comprising:
a storage unit;
a software component retention part configured to retain one or more software modules in a predetermined storage area of the storage unit, the software modules each including a first software component configured to generate print data from application data and a second software component configured to generate, by parsing the print data, output format data in such a data format as to allow a corresponding one or more of the image forming apparatuses to generate bitmap image data by interpreting the output format data, wherein the first and second software components are configured to be installed or uninstalled by adding or deleting the software module including the first and second software components;
a determination part configured to determine, based on the one of the image forming apparatuses specified as the printing destination, one of the software components retained in the storage unit to be used to generate the output format data corresponding to the one of the image forming apparatuses specified as the printing destination; and
a transmission part configured to transmit the output format data generated by the determined one of the software components to the one of the image forming apparatuses specified as the printing destination.

8. The management apparatus as claimed in claim 7, further comprising:
an information retention part configured to retain image forming apparatus information and software module information in a predetermined storage area of the storage unit, the image forming apparatus information being information related to the image forming apparatuses where apparatus identification information for identifying the image forming apparatuses and machine type identification information for identifying machine types of the image forming apparatuses are correlated, the software module information being information related to the software modules where the machine type identification information and software module identification information for identifying the software modules are correlated,
wherein the determination part is configured to refer to the image forming apparatus information based on the apparatus identification information of the one of the image forming apparatuses specified as the printing destination, and thereby to obtain the machine type identification information correlated with said apparatus identification information, and
the determination part is configured to refer to the software module information based on the obtained machine type identification information and obtain the software module identification information correlated with the obtained machine type identification information, and to determine, based on the obtained software module identification information, the one of the software modules to be used to generate the output format data corresponding to the one of the image forming apparatuses specified as the printing destination.

9. The management apparatus as claimed in claim 8, wherein the transmission part is configured to, in response to the apparatus identification information being specified as the printing destination, refer to the image forming apparatus information based on the apparatus identification information and obtain transmission destination information correlated with the apparatus identification information, the transmission destination information being information related to a transmission destination of the output format data, and to transmit the output format data generated using the determined one of the software modules to the one of the image forming apparatuses specified as the printing destination in accordance with the obtained transmission destination information.

10. The management apparatus as claimed in claim 8, wherein the transmission part is configured to, in response to the one of the image forming apparatuses specified as the printing destination including a communications unit assigned a global IP address, the apparatus identification information being the global IP address, and the apparatus identification information being specified as the printing destination, transmit the output format data generated using the determined one of the software modules to the one of the image forming apparatuses specified as the printing destination in accordance with the global IP address.

11. The management apparatus as claimed in claim 8, further comprising:
an apparatus information obtaining part configured to obtain apparatus information from the image forming apparatuses,
wherein the image forming apparatus information is updated based on the obtained apparatus information.

12. The management apparatus as claimed in claim 8, wherein the information retention part is configured to retain user information in a predetermined storage area of the storage unit, the user information being information related to one or more users of the image forming system where user identification information for identifying the users and the apparatus identification information are correlated, and
in response to receiving the print request transmitted from the information processor, one of the users who has made the print request is identified based on the user information, and the apparatus identification information correlated with the identified one of the users is displayed as specification candidate information of the printing destination.

13. An image forming method in an image forming system including one or more image forming apparatuses, and a management apparatus configured to manage and operate the image forming system, to receive a print request transmitted from an information processor, and to instruct, in accordance with the print request, one of the image forming apparatuses specified as a printing destination to perform a predetermined image forming operation, the image forming method comprising the steps of retaining, by the management apparatus, one or more software modules in a predetermined storage area of a storage unit of the management apparatus, the software modules each including a first software component configured to generate print data from application data and a second software component configured to generate output format data in a data format interpretable by a corresponding one or more of the image forming apparatuses by parsing the print data, wherein the first and second software components are configured to be installed or uninstalled by adding or deleting the software module including the first and second software components;

determining, by the management apparatus, based on the one of the image forming apparatuses specified as the printing destination, one of the software components retained in the storage unit to be used to generate the output format data corresponding to the one of the image forming apparatuses specified as the printing destination;

transmitting, by the management apparatus, the output format data generated by the determined one of the software components to the one of the image forming apparatuses specified as the printing destination;

generating, by the one of the image forming apparatuses specified as the printing destination, bitmap image data by interpreting the output format data transmitted from the management apparatus; and forming, by the one of the image forming apparatuses specified as the printing destination, a predetermined image on an image forming medium based on the generated bitmap image data.

* * * * *